United States Patent
Hasebe et al.

(10) Patent No.: US 11,292,862 B2
(45) Date of Patent: Apr. 5, 2022

(54) MODIFIED CONJUGATED DIENE-BASED POLYMER, POLYMER COMPOSITION, AND RUBBER COMPOSITION

(71) Applicant: Asahi Kasei Kabushiki Kaisha, Tokyo (JP)

(72) Inventors: Koichi Hasebe, Tokyo (JP); Ryo Suzuki, Tokyo (JP); Hiromi Nakafutami, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 242 days.

(21) Appl. No.: 16/491,306

(22) PCT Filed: Mar. 5, 2018

(86) PCT No.: PCT/JP2018/008330
§ 371 (c)(1),
(2) Date: Sep. 5, 2019

(87) PCT Pub. No.: WO2018/164053
PCT Pub. Date: Sep. 13, 2018

(65) Prior Publication Data
US 2020/0031975 A1    Jan. 30, 2020

(30) Foreign Application Priority Data

Mar. 7, 2017 (JP) .............................. JP2017-043229

(51) Int. Cl.
*C08F 236/10* (2006.01)
*C08L 21/00* (2006.01)

(52) U.S. Cl.
CPC ............ *C08F 236/10* (2013.01); *C08L 21/00* (2013.01); *C08F 2800/20* (2013.01); *C08F 2810/00* (2013.01)

(58) Field of Classification Search
CPC ............... C08F 236/10; C08F 2800/20; C08F 2810/00; C08L 21/00
USPC ........................................................ 524/526
See application file for complete search history.

(56) References Cited

U.S. PATENT DOCUMENTS

| | | |
|---|---|---|
| 2006/0173138 A1 | 8/2006 | Hogan et al. |
| 2009/0203843 A1* | 8/2009 | Fukuoka ................. C08L 15/00 525/105 |
| 2010/0130686 A1 | 5/2010 | Oshima |
| 2011/0172344 A1 | 7/2011 | Koshida et al. |
| 2013/0023624 A1 | 1/2013 | Sekikawa et al. |
| 2018/0037059 A1 | 2/2018 | Hamann et al. |
| 2018/0037674 A1 | 2/2018 | Yamada et al. |
| 2018/0066076 A1 | 3/2018 | Kyo et al. |
| 2018/0162167 A1 | 6/2018 | Kyo et al. |
| 2020/0199258 A1 | 6/2020 | Hasebe et al. |

FOREIGN PATENT DOCUMENTS

| | | | |
|---|---|---|---|
| CN | 1740204 A | 3/2006 | |
| EP | 2003146 A2 | 12/2008 | |
| EP | 3617237 A | 3/2020 | |
| JP | 2008-527150 A | 7/2008 | |
| JP | 2014-055264 A | 3/2014 | |
| JP | 2014-122359 A | 7/2014 | |
| JP | 2016-079217 A | 5/2016 | |
| JP | 2016079217 A * | 5/2016 | |
| JP | 2017-002189 A | 1/2017 | |
| JP | 2017-203120 A | 11/2017 | |
| WO | 2007/114203 A1 | 10/2007 | |
| WO | 2008/013090 A1 | 1/2008 | |
| WO | 2011/129425 A1 | 10/2011 | |
| WO | 2016/131914 A1 | 8/2016 | |
| WO | 2016/133154 A1 | 8/2016 | |
| WO | 2016/133202 A1 | 8/2016 | |
| WO | 2016/199779 A1 | 12/2016 | |
| WO | WO-2016199779 A1 * | 12/2016 | ............... C08L 9/00 |
| WO | 2018/199267 A1 | 11/2018 | |

OTHER PUBLICATIONS

Supplemental European Search Report issued in counterpart European Patent Application No. 18764543.7 dated May 8, 2020.
International Preliminary Report on Patentability and Written Opinion issued in corresponding International Patent Application No. PCT/JP2018/008330 dated Sep. 10, 2019.
International Search Report issued in corresponding International Patent Application No. PCT/JP2018/008330 dated May 29, 2018.

* cited by examiner

*Primary Examiner* — Kelechi C Egwim
(74) *Attorney, Agent, or Firm* — Morgan, Lewis & Bockius LLP

(57) ABSTRACT

A modified conjugated diene-based polymer
having a weight average molecular weight of $20 \times 10^4$ or more and $300 \times 10^4$ or less, and
having a molecular weight distribution Mw/Mn of 1.6 or more and 4.0 or less, wherein
a modification ratio with respect to a total amount of the conjugated diene-based polymer is 50% by mass or more,
a modification ratio of a component having a molecular weight which is ½ of a molecular weight at a peak top, or a peak top of the minimum molecular weight when a plurality of the peak tops of molecular weights is present, in a gel permeation chromatography curve is ½ or more of the modification ratio with respect to the total amount of the conjugated diene-based polymer, and
a content of nitrogen contained in the modified conjugated diene-based polymer is 3 mass ppm or more and 70 mass ppm or less.

11 Claims, No Drawings

MODIFIED CONJUGATED DIENE-BASED POLYMER, POLYMER COMPOSITION, AND RUBBER COMPOSITION

TECHNICAL FIELD

The present invention relates to a modified conjugated diene-based polymer, a polymer composition, and a rubber composition.

BACKGROUND ART

Recently, there are increasing demands for reduction of fuel consumption in vehicles, and improvement of materials of a vehicle tire, particularly, of a tire tread in contact with the ground is required, heretofore, development of a material having low rolling resistance, namely, a material having a low hysteresis loss property, has been demanded.

Besides, in order to reduce the weight of a tire, it is necessary to reduce the thickness of a tread portion of the tire, and further there is a demand for a material having high abrasion resistance.

On the other hand, a material used for a tire tread is required, from the viewpoint of safety, to be excellent in wet skid resistance and to have practically sufficient fracture characteristics.

A material meeting such requirements is a material containing a rubber-like polymer and a reinforcing filler such as carbon black or silica.

For example, if a rubber material containing silica is used, balance between the low hysteresis loss property and the wet skid resistance can be improved.

Besides, an attempt has been made to reduce a hysteresis loss by improving dispersibility of silica in a rubber material through introduction of a functional group having affinity or reactivity with silica into a molecular end of a rubber-like polymer having high mobility, and further by reducing the mobility of the molecular end of the rubber-like polymer through a bond of the rubber-like polymer with a silica particle.

For example, Patent Literatures 1 and 2 propose a polymer having a functional group formed through a reaction of a cyclic azasilacyclo compound with a polymer active end.

Besides, Patent Literature 3 proposes a diene-based rubber obtained through a coupling reaction between a polymer active end and a multi-functional silane compound.

CITATION LIST

Patent Literature

Patent Literature 1: National Publication of International Patent Application No. 2008-527150
Patent Literature 2: International Publication No. 2011/129425
Patent Literature 3: International Publication No. 2007/114203

SUMMARY OF INVENTION

Technical Problem

A conjugated diene-based rubber material containing silica has, however, a disadvantage of being inferior in silica dispersibility to carbon black because silica has a hydrophilic surface and hence reduces affinity with a conjugated diene-based rubber while carbon black has a hydrophobic surface. Therefore, the conjugated diene-based rubber material containing silica needs to additionally contain a silane coupling agent or the like to improve the dispersibility by imparting a bond to between the silica and the rubber material.

On the other hand, the conjugated diene-based rubber material in which a functional group having high reactivity with silica is introduced into a molecular end disadvantageously tends to be degraded in processability, for example, kneading becomes insufficient because a reaction with a silica particle proceeds during a kneading process whereas slow progression of the reaction consumes time for increasing a torque, or surface coarseness or sheet breakage is easily caused when formed into a sheet after the kneading.

In addition, when such a conjugated diene-based rubber material is used to obtain a vulcanizate, in particular, used to obtain a vulcanizate containing an inorganic filler such as silica, unfortunately, there is room for improvement in the balance between the low hysteresis loss property and the wet skid resistance, and the abrasion resistance.

Therefore, an object of the present invention is to provide a modified conjugated diene-based polymer having good processability, in particular, obtaining a rubber composition having good dispersibility of a filler in a short period of time by adequate exertion of the torque of a mixer during kneading with the filler.

Solution to Problem

The present inventors made earnest studies to solve the above-described problems of the related arts, and as a result, it was found that a modified conjugated diene-based polymer in which a functional group having affinity or reactivity with a filler is introduced into a conjugated diene-based polymer molecule, the modified conjugated diene-based polymer having a weight average molecular weight and a molecular weight distribution in specific ranges, wherein the modification ratio of a component having a molecular weight which is ½ of a peak top molecular weight in a molecular weight curve obtained by GPC (gel permeation chromatography) is equal to or more than a prescribed value compared with the modification ratio of the whole modified conjugated diene-based polymer, and the content of nitrogen falls in a specific range, can solve the above-described problems of the related arts, and thus, the present invention was accomplished.

Specifically, the present invention provides the following:

[1]

A modified conjugated diene-based polymer having a weight average molecular weight of $20 \times 10^4$ or more and $300 \times 10^4$ or less, and having a molecular weight distribution Mw/Mn of 1.6 or more and 4.0 or less, wherein a modification ratio with respect to a total amount of the conjugated diene-based polymer is 50% by mass or more, a modification ratio of a component having a molecular weight which is ½ of a molecular weight at a peak top, or a peak top of the minimum molecular weight when a plurality of weights is present, in a gel permeation chromatography (GPC) curve is ½ or more of the modification ratio with respect to the total amount of the conjugated diene-based polymer, and a content of nitrogen contained in the modified conjugated diene-based polymer is 3 mass ppm or more and 70 mass ppm or less.

[2]
The modified conjugated diene-based polymer according to [1], wherein a shrinkage factor (g') measured by 3D-GPC is 0.86 or more and 1.0 or less.

[3]
The modified conjugated diene-based polymer according to [1], wherein a shrinkage factor (g') measured by 3D-GPC is 0.30 or more and less than 0.86.

[4]
The modified conjugated diene-based polymer according to [3], wherein a shrinkage factor (g') measured by 3D-GPC is 0.30 or more and 0.70 or less.

[5]
The modified conjugated diene-based polymer according to any one of [1] to [4], wherein
each of contents of nitrogen and silicon contained in the modified conjugated diene-based polymer is 3 mass ppm or more, and
a molar ratio of nitrogen to silicon is 1.1 or more and less than 10.

[6]
The modified conjugated diene-based polymer according to any one of [1] to [4], wherein
each of contents of nitrogen and silicon contained in the modified conjugated diene-based polymer is 3 mass ppm or more, and
a molar ratio of nitrogen to silicon is 0.1 or more and less than 0.9.

[7]
The modified conjugated diene-based polymer according to any one of [1] to [6], wherein
a glass transition temperature of the modified conjugated diene-based polymer is −20° C. or more and 0° C. or less.

[8]
The modified conjugated diene-based polymer according to any one of [1] to [6], wherein
a glass transition temperature of the modified conjugated diene-based polymer is −50° C. or more and less than −20° C.

[9]
The modified conjugated diene-based polymer according to any one of claims [1] to [6], wherein
a glass transition temperature of the modified conjugated diene-based polymer is −70° C. or more and less than −50° C.

[10]
A polymer composition comprising 10% by mass or more of the modified conjugated diene copolymer according to any one of [1] to [9].

[11]
A rubber composition comprising:
100 parts by mass of a rubber-like polymer containing 10% by mass or more of the modified conjugated diene copolymer according to any one of [1] to [9]; and
5 to 150 parts by mass of a filler.

Advantageous Effects of Invention

According to the present invention, a modified conjugated diene-based polymer having good processability, in particular, obtaining a rubber composition having good dispersibility of a filler in a shorter period of time than ever because a time to increase a torque is shortened by adequate exertion of the torque of a mixer during kneading with the filler, can be provided.

DESCRIPTION OF EMBODIMENTS

Now, an embodiment for practicing the present invention (hereinafter referred to as the "present embodiment") will be described in detail. The following present embodiment is illustrative merely, and is not intended to limit the present invention to the following description. The present invention can be appropriately modified within the scope thereof.

[Modified Conjugated Diene-Based Polymer]

A modified conjugated diene-based polymer of the present embodiment
has a weight average molecular weight of $20\times10^4$ or more and $300\times10^4$ or less,
has a molecular weight distribution Mw/Mn of 1.6 or more and 4.0 or less, and
has a modification ratio of 50% by mass or more with respect to the total amount of the conjugated diene-based polymer, wherein
the modification ratio of a component having a molecular weight which is ½ of a molecular weight at a peak top, or a peak top of the minimum molecular weight when a plurality of the peak tops of molecular weights is present, in a gel permeation chromatography (GPC) curve is
½ or more of the modification ratio with respect to the total amount of the conjugated diene-based polymer, and
the content of nitrogen contained in the modified conjugated diene-based polymer is 3 ppm or more and 70 ppm or less.

(Modification Ratio)

In the modified conjugated diene-based polymer of the present embodiment, the modification ratio with respect to the total amount of the conjugated diene-based polymer is 50% by mass or more, preferably 60% by mass or more, and more preferably 70% by mass or more.

By the modification ratio is 50% by mass or more, the balance between the low hysteresis loss property and the wet skid resistance is more excellent in the form of a vulcanizate.

The modification ratio refers to a content ratio with % by mass of a polymer component having a specific functional group having affinity or binding reactivity with a filler in the polymer molecule to the total amount of the conjugated diene-based polymer.

Examples of the polymer component having the specific functional group having affinity or binding reactivity with a filler in the polymer molecule preferably include a polymer having a functional group containing a nitrogen atom, a silicon atom or an oxygen atom. The modified conjugated diene-based polymer more preferably has the functional group at an end of the polymer. Examples include a polymer in which a functional group having a nitrogen atom is bonded to a polymerization starting end, and/or a modified conjugated diene-based polymer having a terminating end modified with a functional group containing a nitrogen atom, a silicon atom or an oxygen atom.

The modification ratio can be measured by chromatography that can separate a modified component containing the functional group from a non-modified component. Examples of a method using this chromatography include a method in which quantification is performed using a column for gel permeation chromatography with a polar substance, such as silica, which adsorbs the specific functional group, as a filler, and using an internal standard of a non-adsorbed component in comparison. More specifically, the modification ratio can be calculated by measuring an adsorption amount to the silica column by calculating a difference between a chromatogram obtained by measurement using a polystyrene-based gel column and a chromatogram obtained by measurement using a silica-based column by using a sample solution containing the measurement sample and low molecular weight internal standard polystyrene.

The modification ratio can be measured by a method described in examples below.

The modification ratio of the modified conjugated diene-based polymer of the present embodiment with respect to the total amount of the conjugated diene-based polymer can be controlled to the above-described numeric range by controlling the addition amount of a modifier to the polymer and a polymerization temperature. Specifically, the modification ratio is increased by increasing the addition amount of a modifier and/or decreasing a polymerization temperature.

(Modification Ratio of Low Molecular Weight Component)

The present inventors found that, depending on a polymer, the modification ratio differs among the molecular weight regions by measuring modification ratios in respective molecular weight regions in the molecular weight curve obtained by GPC.

Besides, it was found that a modified conjugated diene-based polymer in which the modification ratio of a component having a molecular weight which is ½ of a peak top molecular weight in a GPC curve (hereinafter sometimes referred to as the low molecular weight component) is ½ or more of the modification ratio of the whole modified conjugated diene-based polymer, is superior in specific performance to a modified conjugated diene-based polymer in which the modification ratio of the low molecular weight component is lower than ½ of the modification ratio of the whole modified conjugated diene-based polymer.

In the modified conjugated diene-based polymer of the present embodiment, the modification ratio of a component having a molecular weight (low molecular weight component) which is ½ of a molecular weight at a peak top of one peak, or a peak top of the minimum molecular weight when a plurality of peak tops is present, in a GPC curve (hereinafter this modification ratio is sometimes referred to as the "½ modification ratio") is ½ or more of the modification ratio with respect to the total amount of the conjugated diene-based polymer. It is preferably 0.55 or more, and is more preferably 0.57 or more.

Thus, a modified conjugated diene-based polymer having good processability in particular, obtaining a rubber composition having good dispersibility of a filler in a shorter period of time than ever by adequate exertion of the torque of a mixer during kneading with the filler can be obtained.

As described above, the present inventor found that, depending on a polymer, the modification ratio differs among molecular weight regions, and additionally found a mechanism as described below as how to transmit a torque during the kneading of the polymer with a filler, and thus, the present invention was accomplished.

Namely, first focusing on the modification ratio of the modified conjugated diene-based polymer with respect to the total amount of the conjugated diene-based polymer, when a Mooney viscosity, a microstructure, a modifier used, kneading conditions, etc. are the same between polymers, a polymer having a high modification ratio (modification ratio of 50% or more) with respect to the total amount of the conjugated diene-based polymer exhibits a faster rate at which a torque is elevated during kneading with a filler than that of a polymer having a low modification ratio. Whereas the maximum value reached by the torque is also high, so the time for the torque to reach the maximum value is almost the same even the polymers differing in modification ratio as a whole. In brief, it is expected that, the modification ratio of the whole polymer influences both the maximum torque value and the torque increase rate, and as a result, the length of the time for the torque to reach the maximum value is not influenced even if the modification ratio as a whole is increased or decreased.

On the other hand, focusing on the modification ratio of the above-described low molecular weight component, namely, the above-described ½ modification ratio, the torque increase rate is slower during the kneading of the polymer with a filler as the ½ modification ratio is lower than the modification ratio with respect to the total amount of the conjugated diene-based polymer, while the torque increase rate is faster as the ½ modification ratio is higher than the modification ratio with respect to the total amount of the conjugated diene-based polymer.

As described above, although the torque increase rate is also influenced by the modification ratio with respect to the total amount of the conjugated diene-based polymer, a higher "½ modification ratio" accelerates the torque increase rate, no matter whether the "modification ratio with respect to the total amount of the conjugated diene-based polymer" is high or low. Namely, the influence of the "½ modification ratio" compared with the "modification ratio with respect to the total amount of the conjugated diene-based polymer" on the torque increase rate is constant independently of the "modification ratio with respect to the total amount of the conjugated diene-based polymer".

On the other hand, the maximum torque value depends on the modification ratio of the whole modified conjugated diene-based polymer and therefore, does not change depending on the ½ modification ratio, namely, is independent of the ½ modification ratio, and thus, the time for the torque to reach the maximum value is shorter as the ½ modification ratio is higher. For this reason, the time for the torque to reach the maximum value can be controlled by the height of the ½ modification ratio compared with the modification ratio with respect to the total amount of the conjugated diene-based polymer, independently of the modification ratio with respect to the total amount of the conjugated diene-based polymer.

Specifically, by adjusting the ½ modification ratio to a height of ½ or more of the modification ratio with respect to the total amount of the conjugated diene-based polymer, the dispersibility of a filler becomes good in a shorter period of time than ever due to the processability, in particular, adequate exertion of the torque of a mixer during kneading with the filler. As a result, the thermal degradation of the polymer during the kneading can be minimized. Besides, an effect of being capable of reducing the amount of a heat resistance stabilizer to be compounded is obtained because the thermal degradation rarely occurs.

Besides, when the modification ratio of the low molecular weight component is ½ or more of the modification ratio with respect to the total amount of the conjugated diene-based polymer, the balance between the low hysteresis loss property and the wet skid resistance, the fracture characteristics and the abrasion resistance, in the case that the modified conjugated diene-based polymer of the present embodiment is made into a vulcanized composition, are excellent, and the degree of freedom of composition design particularly for obtaining a rubber composition excellent in fuel efficiency for a tire is enhanced.

In the case of producing a rubber composition for a tire, a modified conjugated diene-based polymer having a higher branching degree and/or a higher molecular weight is effectively used for improving fuel efficiency performance. On the other hand, a problem associated with processing such as difficult kneading with a filler or the like might arise. However, when a technique of enhancing the processability of the modified conjugated diene-based polymer is adopted, the problem is prevented from arising in a kneading step or the like even if the modified conjugated diene-based polymer having a higher branching degree and/or a higher molecular weight is used, and as a result, a composition more suitable for a tire is easily prepared.

From such a viewpoint, in the modified conjugated diene-based polymer of the present embodiment, the modification ratio of the component having a molecular weight which is ½ of a peak top molecular weight in a GPC curve, namely, the modification ratio of the low molecular weight component, is set to ½ or more of the modification ratio with respect to the total amount of the conjugated diene-based polymer.

The modified conjugated diene-based polymer of the present embodiment can be obtained by a polymerization method in which the termination of a growth reaction or chain transfer is minimized, and this can be achieved by an ultra-higher purity of a monomer and a solvent to be introduced into a polymerization reactor, low temperature polymerization and a monomer conversion ratio of less than 99% by mass.

Besides, the modified conjugated diene-based polymer of the present embodiment can also be obtained by kneading a high molecular weight modified conjugated diene-based polymer with a low molecular weight modified conjugated diene-based polymer.

The modification ratio of each molecular weight component can be measured by chromatography that can separate a modified component containing the functional group from a non-modified component. Examples of a method using this chromatography include a method in which quantification is performed using a column for gel permeation chromatography with a polar substance, such as silica, which adsorbs the specific functional group, as a filler, and using an internal standard of a non-adsorbed component in comparison. More specifically, a chromatogram obtained by measurement using a polystyrene-based gel column and a chromatogram obtained by measurement using a silica-based column are obtained by using a sample solution containing the sample for measurement and low molecular weight internal standard polystyrene, and based on a difference of each molecular weight component between these chromatograms, an adsorption amount to the silica column is measured, thereby the modification ratio of each molecular weight component is obtained. Besides, the modification ratio can be measured by a method described in Examples.

In order to adjust the modification ratio of the component having a molecular weight which is ½ of a peak top molecular weight in a GPC curve to ½ or more of the modification ratio with respect to the total amount of the conjugated diene-based polymer, it is effective to adopt a method reducing the amount of an end to be inactivated during polymerization by increasing the purities of a monomer and a solvent to be introduced into a reactor.

(Nitrogen Content)

In the modified conjugated diene-based polymer of the present embodiment, the content of nitrogen contained in the modified conjugated diene-based polymer is 3 ppm or more and 70 ppm or less, preferably 6 ppm or more and 60 ppm or less, and more preferably 10 ppm or more and 50 ppm or less.

When the nitrogen content is 3 ppm or more, the balance between the low hysteresis loss property and the wet skid resistance obtained when in the form of a vulcanizate is more excellent.

When the nitrogen content is 70 ppm or less, the rigidity can be prevented from being reduced due to too much dispersion of silica when used to obtain a compound.

There is a tendency that the nitrogen content of 3 ppm or more can be attained by adopting a compound containing nitrogen as a modifier. On the other hand, for example, when the ratio of nitrogen contained in the modifier is too high, when the addition amount of the nitrogen-containing modifier is too large with respect to the polymer chain, or when nitrogen is bonded to both a polymerization starting end and a polymerization terminating end, the nitrogen content tends to easily exceed 70 ppm. For this reason, the content of nitrogen in the modified conjugated diene-based polymer can be controlled to 70 ppm or less by properly adjusting the ratio of nitrogen contained in the modifier, the addition amount of the nitrogen-containing modifier, and the amount of the modifier bound to a polymerization end.

(Weight Average Molecular Weight)

The weight average molecular weight of the modified conjugated diene-based polymer of the present embodiment is $20 \times 10^4$ or more and $300 \times 10^4$ or less, preferably $30 \times 10^4$ or more and $270 \times 10^4$ or less, and more preferably $40 \times 10^4$ or more and $250 \times 10^4$ or less.

When the weight average molecular weight is $20 \times 10^4$ or more and $300 \times 10^4$ or less, the balance between the low hysteresis loss property and the wet skid resistance and the abrasion resistance in the form of a vulcanizate is excellent.

Besides, when the weight average molecular weight is $300 \times 10^4$ or less, the dispersibility of a filler when used to obtain a vulcanizate is excellent, and excellent fracture characteristics are obtained.

The weight average molecular weight of the modified conjugated diene-based polymer can be controlled to the above-described numeric range by adjusting the amount of a polymerization initiator with respect to a monomer. Specifically, the weight average molecular weight can be decreased by increasing the amount of a polymerization initiator with respect to a monomer.

The weight average molecular weight of the modified conjugated diene-based polymer is measured by a method described in examples below.

(Molecular Weight Distribution)

In the modified conjugated diene-based polymer of the present embodiment, molecular weight distribution Mw/Mn corresponding to a ratio of a weight average molecular weight (Mw) to a number average molecular weight (Mn) is 1.6 or more and 4.0 or less. A modified conjugated diene-based polymer having a molecular weight distribution falling in this range tends to be superior in the processability when used for obtaining a vulcanizate to a polymer having a molecular weight and a modification ratio comparable therewith. Mw/Mn is preferably 1.8 or more and 3.0 or less, and more preferably 1.9 or more and 2.5 or less.

The modified conjugated diene-based polymer having such a molecular weight distribution can be preferably obtained by continuous polymerization.

For the molecular weight distribution, it is preferable that the molecular weight curve obtained by GPC has a monomodal shape or, when a plurality of peaks is present, has a trapezoidal or multimodal shape. The multimodal shape means a shape in which the height of the lowest part between a peak and a peak is 50% or more of the heights of both the peaks. The modified conjugated diene-based polymer having such a molecular weight distribution tends to be more excellent in the processability at the time obtaining a vulcanizate.

The modified conjugated diene-based polymer of the present embodiment preferably contains 0.3% by mass or more and 20% by mass or less of a modified conjugated diene-based polymer having a molecular weight of 2,000,000 or more and 5,000,000 or less (hereinafter sometimes referred to as the "specific high molecular weight component"). Thus, the balance between the low hysteresis loss property and the wet skid resistance and the abrasion resistance in the form of a vulcanizate tends to be more excellent.

The content of the specific high molecular weight component is more preferably 1.0% by mass or more and 18% by mass or less, and further preferably 2.0% by mass or more and 15% by mass or less.

In order to obtain the modified conjugated diene-based polymer containing the specific high molecular weight component in the content falling in the above-described range, for example, the amount of an organomonolithium compound described later to be used as a polymerization initiator may be controlled. In the polymerization step described later, it is preferably to select a method using a residence time distribution, namely, a method expanding a time distribution of a growth reaction in no matter which of continuous polymerization or batch polymerization.

Examples of a specific method for the continuous polymerization include:

a method using a tank reactor equipped with a stirrer as a back-mix reactor of a type performing vigorous mixing with a stirrer, and preferably as a complete mixing reactor;

a method using a tubular reactor and recirculating a part thereof;

a method providing a feeding portion of a polymerization initiator in a monomer inlet or the vicinity thereof as well as in an inlet disposed in the middle of another polymerization reactor; and a method using a tank reactor and a tubular reactor in combination.

According to these methods, a retention time distribution can be expanded, and a polymer component having a long retention time can get to be the high molecular weight component.

A specific example of the batch polymerization includes a method feeding a polymerization initiator continuously or intermittently from the start to the middle of the polymerization, or at the start of the polymerization and/or in the middle of the polymerization.

In this method, a polymer having been polymerized from the start of polymerization, when the polymerization initiator is initially fed, can be the high molecular weight component and has a different molecular weight from a polymer started to be polymerized later. More specifically, a polymer having an expanded molecular weight distribution tends to be obtained by feeding continuously a polymerization initiator to a monomer, in an amount corresponding to a target molecular weight, for example, between a conversion ratio of 0% by mass and 95% by mass.

By employing the above-described method, the activity ratio of a living end of the conjugated diene-based polymer before the modification step tends to be higher, and a modified conjugated diene-based polymer having a high coupling ratio after coupling, namely, a high modification ratio, tends to be obtained. Among these methods, the method using a tank reactor equipped with a stirrer as a back-mix reactor of a type performing vigorous mixing with a stirrer is further preferable.

Herein, the term "molecular weight" refers to a molecular weight in terms of standard polystyrene obtained by GPC (gel permeation chromatography).

The number average molecular weight, the weight average molecular weight, and the molecular weight distribution can be measured by a method described in examples below.

(Shrinkage Factor)

A preferred form of the modified conjugated diene-based polymer of the present embodiment is a modified conjugated diene-based polymer having a shrinkage factor (g') of 0.86 or more and 1.0 or less measured using 3D-GPC.

When the shrinkage factor (g') of the modified conjugated diene-based polymer of the present embodiment falls in the above-described range, the strength at a high temperature tends to be excellent.

The shrinkage factor (g') serves as an index of a branched structure of the modified conjugated diene-based copolymer, and a modified conjugated diene-based polymer having a shrinkage factor (g') of 0.86 or more and 1.0 or less is a modified conjugated diene-based polymer in which the number of branches in one molecule of the modified diene-based polymer is three or less branches. In such a case, the shrinkage factor (g') is more preferably 0.88 or more and 0.99 or less, and further preferably 0.90 or more and 0.98 or less.

In order to obtain the modified conjugated diene-based copolymer having a shrinkage factor (g') falling in the above-described range, for example, a method is effective in which a modifier having three or less reactive sites for a living active end is added at a mole number of ⅓ or more with respect to the total mole number of a polymerization initiator to obtain a modified conjugated diene-based copolymer having three or less branches.

Another preferred form of the modified conjugated diene-based polymer of the present embodiment has a shrinkage factor (g') of 0.30 or more and less than 0.86 measured using 3D-GPC.

Such a modified conjugated diene-based polymer tends to drastically reduce the viscosity of a rubber composition additionally containing a filler and be exceedingly excellent in processability.

The shrinkage factor (g') serves as an index of a branched structure of the modified conjugated diene-based copolymer, and a modified conjugated diene-based polymer having a shrinkage factor (g') of 0.30 or more and less than 0.86 is a modified diene-based polymer in which the number of branches in one molecule of the modified diene-based polymer is four or more branches.

In order to obtain the modified conjugated diene-based copolymer having a shrinkage factor (g') falling in the above-described range, for example, a method is effective in which a modifier having four or more reactive sites for a living active end is added at a mole number of ¼ or less with respect to the total mole number of a polymerization initiator to obtain a modified conjugated diene-based copolymer having four or more branches.

In the modified conjugated diene-based polymer of the present embodiment, the shrinkage factor (g') measured using 3D-GPC is more preferably 0.30 or more and 0.70 or less.

Such a modified conjugated diene-based polymer more reduces the viscosity of a composition additionally containing a filler and is further excellent in processability.

The shrinkage factor (g') serves as an index of a branched structure of the modified conjugated diene-based copolymer, and a modified conjugated diene-based polymer having a shrinkage factor (g') of 0.30 or more and 0.70 or less is a modified conjugated diene-based polymer in which the number of branches in one molecule of the modified diene-based polymer is five or more branches.

In order to obtain the modified conjugated diene-based copolymer having a shrinkage factor (g') falling in the above-described range, for example, a method is effective in which a modifier having five or more reactive sites for a living active end is added at a mole number of ⅕ or less with respect to the total mole number of a polymerization initiator to obtain a modified conjugated diene-based copolymer having five or more branches.

The shrinkage factor (g') measured by measurement according to a GPC-light scattering method with a viscosity detector (hereinafter sometimes simply referred to as the "GPC-light scattering measurement with a viscosity detector" or the "3D-GPC measurement") serves as an index of the number of branches of the modified conjugated diene-based polymer. For example, as the shrinkage factor (g') is decreased, the number of branches of the modified conjugated diene-based polymer (for example, the number of branches of a star polymer (also referred to as "the number of arms of a star polymer")) tends to be increased.

In the case of comparing modified conjugated diene-based polymers having an equal molecular weight, as the number of branches of the modified conjugated diene-based polymer is larger, the shrinkage factor (g') is smaller. In this case, the shrinkage factor (g') can be used as an index of a branching degree.

The shrinkage factor (g') is measured by using the 3D-GPC measurement.

When constants (K and α) in a relational formula of an intrinsic viscosity and a molecular weight ($[\eta]=KM\alpha$ ($[\eta]$: intrinsic viscosity, M: molecular weight) are defined as log K=−3.883 and α=0.771, 1000 to 20000000 are input as the range of the molecular weight M to prepare a graph of the relation between a standard intrinsic viscosity $[\eta]_0$ and the molecular weight M.

An intrinsic viscosity $[\eta]$ at each molecular weight M of a sample obtained by the 3D-GPC measurement with respect to this standard intrinsic viscosity $[\eta]_0$ is represented by $[\eta]/[\eta]_0$ as the relation of the intrinsic viscosity $[\eta]$ to the standard intrinsic viscosity $[\eta]_0$ and calculated as to the respective molecular weights M, and an average thereof is defined as the shrinkage factor (g').

More preferably, the shrinkage factor (g') can be measured by a method described in examples below.

(Configuration of Modified Conjugated Diene-Based Polymer)

The modified conjugated diene-based polymer of the present embodiment is preferably a modified conjugated diene-based polymer in which a modifier residue having a functional group having affinity or reactivity with a filler is bonded to a polymerization starting end and/or terminating end.

Namely, the modified conjugated diene-based polymer of the present embodiment is composed of a modifier residue having the functional group and a conjugated diene-based polymer chain.

(Modifier Residue)

The modifier residue in the modified conjugated diene-based polymer of the present embodiment is a constituent unit of the modified conjugated diene-based polymer bonded to the conjugated diene-based polymer chain, and is, for example, a constituent unit derived from a modifier and generated through a reaction between the conjugated diene-based polymer and the modifier described later.

The modifier residue has a specific functional group having affinity or binding reactivity with a filler.

When the modified conjugated diene-based polymer of the present embodiment is a modified conjugated diene-based polymer in which the functional group is bonded to a polymerization starting end, the modified conjugated diene-based polymer can be obtained through a polymerization reaction using a polymerization initiator having the functional group.

Preferred Embodiment Regarding Functional Group

Examples of the above-described specific functional group having affinity or binding reactivity with a filler preferably include a functional group containing a nitrogen atom or a silicon atom.

More preferably, the ratio of the mole number of a nitrogen atom to the mole number of a silicon atom in the modified conjugated diene-based polymer, namely, the N/Si molar ratio, is preferably 0.1 to 10.0, and more preferably 0.2 to 7.0.

When the N/Si molar ratio falls in above-described range, the affinity with a silica-based filler is particularly good. A rubber composition containing a silica-based filler has small hysteresis loss and exerts good performance as a rubber composition for a low fuel consumption tire.

Examples of the functional group containing a silicon atom include, but are not limited to, a methoxysilyl group, an ethoxysilyl group, and a propoxysilyl group.

Examples of the functional group containing a nitrogen atom include, but are not limited to, a secondary amino group and a tertiary amino group.

The modified conjugated diene-based polymer of the present embodiment is preferably a modified conjugated diene-based polymer having a functional group containing a nitrogen atom in the polymer molecule. In such a case, the functional group containing a nitrogen atom is particularly preferably a functional group containing at least secondary amine of —NH— type as the nitrogen atom. In this case, a rubber composition containing a silica-based filler and carbon black as a filler has small hysteresis loss and exerts good performance as a composition for a low fuel consumption tire.

When the modifier residue has a silicon atom, it is preferable that at least one silicon atom constitutes an alkoxysilyl group having 1 to 20 carbon atoms or a silanol group. This tends to improve the dispersibility of a filler and improve fuel efficiency.

In the modified conjugated diene-based polymer of the present embodiment, ends of a plurality of the conjugated diene-based polymer chains may be bonded to one silicon atom. Alternatively, an end of the conjugated diene-based polymer chain and an alkoxy group or a hydroxyl group may be bonded to one silicon atom, so that the one silicon atom can constitute an alkoxysilyl group or a silanol group.

(Monomer Constituting Conjugated Diene-Based Polymer)

The conjugated diene-based polymer before modification of the modified conjugated diene-based polymer of the present embodiment is obtained by polymerizing at least a conjugated diene compound, and is obtained, if necessary, by copolymerizing both a conjugated diene compound and a vinyl-substituted aromatic compound.

The conjugated diene compound is not especially limited as long as it is a polymerizable monomer, and is preferably a conjugated diene compound containing 4 to 12 carbon atoms per molecule, and more preferably a conjugated diene compound containing 4 to 8 carbon atoms. Examples of such a conjugated diene compound include, but are not limited to, 1,3-butadiene, isoprene, 2,3-dimethyl-1,3-butadiene, 1,3-pentadiene, 3-methyl-1,3-pentadiene, 1,3-hexadiene and 1,3-heptadiene. Among these, 1,3-butadiene and isoprene are preferred from the viewpoint of industrial availability. One of these compounds may be singly used, or two or more of these may be used together.

The vinyl-substituted aromatic compound is not especially limited as long as it is a monomer copolymerizable with the conjugated diene compound, and is preferably a monovinyl aromatic compound. Examples of the monovinyl aromatic compound include, but are not limited to, styrene, p-methylstyrene, α-methylstyrene, vinyl ethyl benzene, vinyl xylene, vinyl naphthalene and diphenyl ethylene. Among these, styrene is preferred from the viewpoint of industrial availability. One of these compounds may be singly used, or two or more of these may be used together.

Preferred Embodiment for SBR

When the modified conjugated diene-based polymer of the present embodiment is a butadiene-styrene random copolymer (SBR), the amount of bound styrene is preferably 5% by mass to 50% by mass, and the amount of bound vinyl is preferably 10 mol % to 75 mol %. When these amounts fall in the above-described ranges, SBR for a tire as well as adaptable to any use is industrially obtained.

In particular, when the amount of bound styrene is 25% by mass to 45% by mass and the amount of bound vinyl is 18 mol % to 30 mol %, a rubber composition having small hysteresis loss and excellent abrasion resistance is obtained.

Besides, when the amount of bound styrene is 18% by mass to 28% mass and the amount of bound vinyl is 45 mol % to 65 mol %, a rubber composition compounded with a natural rubber is obtained as a rubber composition for a fuel efficient tire having small hysteresis loss and excellent strength.

The amount of bound styrene refers to % by mass of styrene in all monomer components, and the amount of bound vinyl refers to mol % of a vinyl bond component in butadiene components.

(Glass Transition Temperature)

The glass transition temperature, namely, Tg of the modified conjugated diene-based polymer of the present embodiment is a temperature at which the molecular chain of the modified conjugated diene-based polymer starts a rotational motion, and largely influences fuel efficiency and wet grip characteristics.

When Tg is low, the fuel efficiency is good. When Tg is high, the wet grip characteristics is improved.

A preferred form of the modified conjugated diene-based polymer of the present embodiment has Tg of preferably −20° C. or more and 0° C. or less. Thus, the wet grip characteristics and the rigidity are exceedingly good. This modified conjugated diene-based polymer is exceedingly useful for a tire for high performance and a tire for ultrahigh performance.

Another preferred form of the modified conjugated diene-based polymer of the present embodiment has Tg of −50° C. or more and less than −20° C. Thus, the balance between the fuel efficiency and the wet grip characteristics is exceedingly excellent. This modified conjugated diene-based polymer is exceedingly useful for a tire for summer and a tire for all seasons.

A further alternative preferred form of the modified conjugated diene-based polymer of the present embodiment has Tg of −70° C. or more and less than −50° C. Thus, the low temperature performance and the abrasion resistance are exceedingly good.

This modified conjugated diene-based polymer is exceedingly useful for a tire for winter.

Besides, in order to improve the abrasion resistance, it is used as a composition for various tire treads.

The Tg of the modified conjugated diene-based polymer can be controlled to the desired range described above by adjusting a styrene content and/or the amount of a 1,2-vinyl bond. Specifically, Tg can be increased by increasing a styrene content and the amount of a 1,2-vinyl bond.

The Tg of the modified conjugated diene-based polymer can be measured in accordance with ISO 22768: 2006.

(Preferred Form of Random SBR)

When the modified conjugated diene-based polymer of the present embodiment is a butadiene-styrene random copolymer (SBR), a proportion of styrene unit existing singly is preferably large, and a long chain of styrene is preferably few in number.

Specifically, in a case of the modified conjugated diene-based polymer is a butadiene-styrene copolymer, when the modified conjugated diene-based polymer is decomposed by employing a method through ozonolysis known as a method of Tanaka et al., (Polymer, 22, 1721 (1981)) to analyze a styrene chain distribution by GPC, it is preferable that the amount of isolated styrene to the whole amount of bound styrene is 40% by mass or more, and that the amount of a chain styrene structure consisting of 8 or more chained styrene is 5.0% by mass or less. In this case, a rubber composition for a fuel efficient tire in which a resultant vulcanized rubber attains excellent performance of particularly low hysteresis loss is obtained.

(Hydrogenated Conjugated Diene-Based Polymer)

In the modified conjugated diene-based polymer of the present embodiment may be obtained by further hydrogenating the modified conjugated diene-based polymer or a conjugated diene-based polymer before modification in an inert solvent. Thus, all or some of double bonds can be converted into saturated hydrocarbon. In such a case, heat resistance and weather resistance can be improved so as to prevent degradation of a product when processed at a high temperature, and the dynamic performance as a rubber tends to be improved. As a result, further excellent performance can be exhibited in various uses including vehicle use.

A hydrogenation rate of an unsaturated double bond based on a conjugated diene compound can be arbitrarily selected in accordance with the purpose, and is not especially limited. When it is used in the form of a vulcanizate, a double bond of a conjugated diene portion preferably partially remains. From this viewpoint, a rate of hydrogenation of the conjugated diene portion in the conjugated diene-based polymer is preferably 3.0% by mole or more and 70% by mole or less, more preferably 5.0% by mole or more and 65% by mole or less, and further preferably 10% by mole or more and 60% by mole or less. In particular, if a vinyl group is selectively hydrogenated, the heat resistance and the dynamic performance tend to be improved. The hydrogenation rate can be obtained using a nuclear magnetic resonance apparatus (NMR).

(Oil-Extended Polymer and Mooney Viscosity)

The modified conjugated diene-based polymer of the present embodiment may be made into an oil-extended polymer additionally containing an extender oil.

From the viewpoint of the processability obtained when used for obtaining a rubber vulcanizate and the abrasion resistance obtained when in the form of a vulcanizate, the Mooney viscosity of the modified conjugated diene-based polymer of the present embodiment measured at 100° C. is preferably 20 or more and 100 or less, and more preferably 30 or more and 80 or less. The Mooney viscosity can be measured by a method described in examples below.

(Nitrogen and Silicon Contents)

In the modified conjugated diene-based polymer of the present embodiment, the content of nitrogen is 3 mass ppm or more and 70 mass ppm or less, preferably 6 mass ppm or more and 60 mass ppm or less, and more preferably 10 mass ppm or more and 50 mass ppm or less.

When the content of nitrogen is 3 mass ppm or more, the balance between the low hysteresis loss property and the wet skid resistance obtained when in the form of a vulcanizate is more excellent.

When the nitrogen content is 70 mass ppm or less, the rigidity can be prevented from being reduced due to too much dispersion of silica when used to obtain a compound.

From the viewpoint of improvement in fuel efficiency, each of the contents of nitrogen and silicon in the modified conjugated diene-based copolymer of the present embodiment is preferably 3 mass ppm or more, more preferably 7 mass ppm or more, and further preferably 10 mass ppm or more.

It is considered that the modified conjugated diene-based copolymer of the present embodiment is physically adsorbed to a filler through nitrogen and chemically bonded to the filler through silicon when kneaded with the filler.

For the modified conjugated diene-based copolymer of the present embodiment, the molar ratio between nitrogen and silicon to be contained is important. The molar ratio of nitrogen to silicon (N/Si) is preferably 1.1 or more and less than 10 from the viewpoint that silica can be dispersed in a short period of time during kneading, and is more preferably 1.3 or more and 7 or less, and further preferably 1.5 or more and 5 or less. The reason why the N/Si molar ratio that falls in the above-described range is preferred, is presumably that the molar ratio of nitrogen to silicon is preferably equimolar or more because the physical adsorption through nitrogen has a faster reaction rate than that of the chemical bond through silicon.

Another preferred form of the modified conjugated diene-based copolymer of the present embodiment has a molar ratio of nitrogen to silicon (N/Si) of 0.1 or more and less than 0.9. Thus, silica can be dispersed in a short period of time during kneading. In such a case, the ratio is more preferably 0.2 or more and 0.75 or less, and further preferably 0.3 or more and 0.6 or less.

The reason why the molar ratio of nitrogen to silicon of 0.1 or more and less than 0.9 is preferred is not clear at present, but is presumably that the molar ratio of nitrogen to silicon is preferably less than equimolar because the bond of the physical adsorption through nitrogen is stronger than the chemical bond through silicon. In this case, the content of silicon is preferably 7 mass ppm or more.

The molar ratio of nitrogen to silicon in the modified conjugated diene-based copolymer of the present embodiment may be controlled by the modifier to be used in the modification reaction of the conjugated diene-based copolymer.

For example, the molar ratio of nitrogen to silicon in the modified conjugated diene-based copolymer may be elevated by elevating the molar ratio of nitrogen to silicon in the modifier.

(Preferred Structure of Modified Conjugated Diene-Based Polymer)

The modified conjugated diene-based polymer of the present embodiment is preferably represented by the following general formula (I):

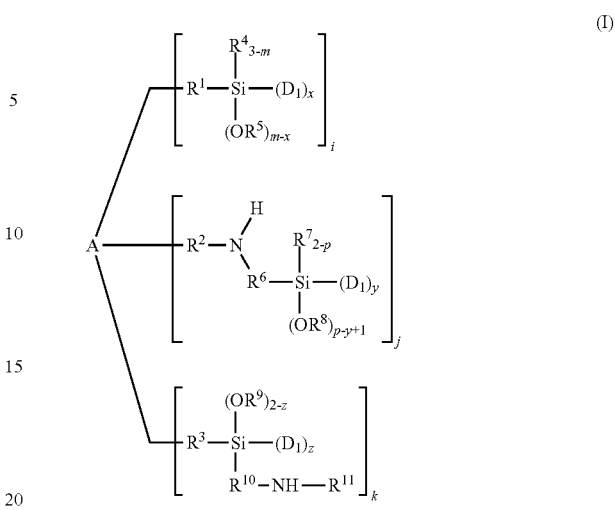

In formula (I), $D_1$ represents a diene-based polymer chain, $R^1$ to $R^3$ each independently represent a single bond or an alkylene group having 1 to 20 carbon atoms, $R^4$ and $R^7$ each independently represent an alkyl group having 1 to 20 carbon atoms, $R^5$, $R^8$ and $R^9$ each independently represent a hydrogen atom or an alkyl group having 1 to 20 carbon atoms, $R^6$ and $R^{10}$ each independently represent an alkylene group having 1 to 20 carbon atoms, and $R^{11}$ represents a hydrogen atom or an alkyl group having 1 to 20 carbon atoms.

m and x each represent an integer of 1 to 3, x≤m, p represents 1 or 2, y represents an integer of 1 to 3, y≤(p+1), and z represents an integer of 1 or 2.

Each of $D_1$, $R^1$ to $R^{11}$, p, x, y and z, if present in a plural number, is respectively independent.

i represents an integer of 0 to 6, j represents an integer of 0 to 6, k represents an integer of 0 to 6, (i+j+k) is an integer of 1 to 10, and ((x×i)+(y×j)+(z×k)) is an integer of 1 to 30.

A represents a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen. However, when (i+j+k) is 1, A may be absent. Thus, the modified conjugated diene-based polymer tends to be more excellent in the balance between the low hysteresis loss property and the wet skid resistance and the abrasion resistance obtained when in the form of a vulcanizate.

In the modified conjugated diene-based polymer of the present embodiment, A in the above-described formula (I) is represented by any one of the following general formulas (II) to (V):

In formula (II), $B^1$ represents a single bond or a hydrocarbon group having 1 to 20 carbon atoms, a represents an integer of 1 to 10, and $B^1$, if present in a plural number, is respectively independent.

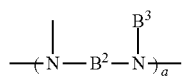

(III)

In formula (III), $B^2$ represents a single bond or a hydrocarbon group having 1 to 20 carbon atoms, $B^3$ represents an alkyl group having 1 to 20 carbon atoms, a represents an integer of 1 to 10, and each of $B^2$ and $B^3$, if present in a plural number, is respectively independent.

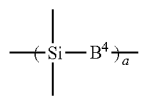

(IV)

In formula (IV), $B^4$ represents a single bond or a hydrocarbon group having 1 to 20 carbon atoms, a represents an integer of 1 to 10, and $B^4$, if present in a plural number, is respectively independent.

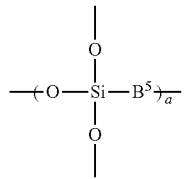

(V)

In formula (V), $B^5$ represents a single bond or a hydrocarbon group having 1 to 20 carbon atoms, a represents an integer of 1 to 10, and $B^5$, if present in a plural number, is respectively independent. Thus, the balance between the low hysteresis loss property and the wet skid resistance and the abrasion resistance in the form of a vulcanizate tend to be more excellent. Besides, such a polymer tends to be practically more easily available.

[Method for Producing Modified Conjugated Diene-Based Polymer]

A method for producing the modified conjugated diene-based polymer of the present embodiment preferably includes a polymerization step of polymerizing at least a conjugated diene compound using an organomonolithium compound as a polymerization initiator to give a conjugated diene-based polymer, and a modification step of reacting the conjugated diene-based polymer with a modifier having a bonding group reactive to an active end of the conjugated diene-based polymer and further having a specific functional group having affinity or binding reactivity with a filler.

(Polymerization Step)

In the method for producing the modified diene-based polymer of the present embodiment, the polymerization step is preferably to obtain a conjugated diene-based polymer by polymerizing at least a conjugated diene compound with an organomonolithium compound as a polymerization initiator.

The polymerization step is preferably performed by polymerizing through a growth reaction of living anionic polymerization, and thus, a conjugated diene-based polymer having an active end can be obtained, and a modified diene-based polymer having a high modification ratio tends to be obtained in the modification step described later.

In the modified conjugated diene-based polymer of the present embodiment, the modification ratio of the component having a molecular weight which is ½ of a peak top molecular weight in a GPC curve, namely, the low molecular weight component, is ½ or more of the modification ratio with respect to the total amount of the conjugated diene-based polymer.

In order to obtain such a modified conjugated diene-based polymer, it is effective to obtain the conjugated diene-based polymer by a polymerization method minimized the termination of a growth reaction or chain transfer.

Therefore, an ultra-high purification of a monomer and a solvent to be introduced into a polymerization reactor is required to be equal to or more than conventional level.

Accordingly, total of impurities in the monomer components to be used are preferably 30 ppm or less, and the content concentrations (masses) of impurities such as allenes, acetylenes, and primary and secondary amines, are preferably 20 ppm or less and more preferably 10 ppm or less of the allenes, preferably 20 ppm or less and more preferably 10 ppm or less of the acetylenes, and preferably 4 ppm or less and more preferably 2 ppm or less (in terms of a total nitrogen content) of the primary and secondary amines.

Examples of the allenes include, but are not limited to, propadiene and 1,2-butadiene. Examples of the acetylenes include, but are not limited to, ethyl acetylene and vinyl acetylene. Examples of the primary and secondary amines include, but are not limited to, methylamine and dimethylamine.

The ultra-high purification of a monomer and a solvent can be achieved by sufficiently purifying all monomers and solvents to be used in polymerization.

For the purification of a monomer of butadiene, it is important not only to remove a polymerization inhibitor but also to remove dimethylamine, N-methyl-γ-aminobutyric acid, or the like which might adversely affect anionic polymerization. Examples of a method for removing these include a method washing 1,3-butadiene containing a polymerization inhibitor with low oxygen water having an oxygen concentration of less than 2 mg/L as washing water, and then, removing the polymerization inhibitor in the 1,3-butadiene.

For the purification of a monomer of styrene, it is important to remove phenylacetylenes or the like which might adversely affect anionic polymerization. Examples of a method for removing the phenylacetylenes include a method carrying out a hydrogenation reaction using a palladium supported alumina catalyst.

For the purification of a polymerization solvent of normal hexane, it is important to remove water which might adversely affect anionic polymerization. Examples of a method for removing this include a method using γ-alumina, synthetic zeolite, or the like. Among these, a method using synthetic zeolite is preferably employed. The synthetic zeolite preferably has a large pore size and has a pore size of more preferably 0.35 nm or more, and further preferably 0.42 nm or more.

As the polymerization method minimizing the termination of a growth reaction or chain transfer, it is effective that a method to control a polymerization temperature and a monomer conversion ratio.

A polymerization temperature is preferably lower from the viewpoint of suppressing the termination of a growth reaction or chain transfer, while the polymerization temperature is preferably a temperature at which the living anionic polymerization sufficiently proceeds from the viewpoint of productivity.

Specifically, the polymerization temperature is preferably 0° C. or more and preferably 80° C. or less, and more preferably 50° C. or more and 75° C. or less. Besides, the reaction with a modifier is preferably performed at a conversion ratio of less than 99% by mass, of all monomers. The formation of a polymer in which a terminating end is not modified, or other side reactions can be suppressed by adding the modifier at a stage where the monomer remains in a polymerization reactor, and reacting a growing polymer chain with the modifier before consumption of the monomer. More preferably, the conversion ratio is less than 98% by mass.

The conjugated diene-based polymer may be a random copolymer or a block copolymer. In order to form the conjugated diene-based polymer as a rubber-like polymer, the conjugated diene compound is used in an amount of preferably 40% by mass or more and more preferably 55% by mass or more with respect to the amount of all monomers used in the conjugated diene-based polymer.

Examples of the random copolymer include, but are not limited to, a random copolymer containing two or more conjugated diene compounds such as a butadiene-isoprene random copolymer, and a random copolymer containing conjugated diene and the vinyl-substituted aromatic compound such as a butadiene-styrene random copolymer, an isoprene-styrene random copolymer or a butadiene-isoprene-styrene random copolymer.

A composition distribution of each monomer contained in a copolymer chain is not especially limited, and examples include a completely random copolymer whose composition is almost statistically random, and a tapered (gradient) random copolymer whose composition is distributed in a tapered manner. A bonding mode of the conjugated diene, namely, the composition of a 1,4-bond, a 1,2-bond or the like may be homogeneous or distributed.

Examples of the block copolymer include, but are not limited to, a two-block (diblock) copolymer consisting of two blocks, a three-block (tri-block) copolymer consisting of three blocks, and a four-block (tetra-block) copolymer consisting of four blocks. A polymer constituting every block may be a polymer containing one monomer or a copolymer containing two or more monomers. Assuming that a polymer block containing 1,3-butadiene is expressed as "B", a copolymer of 1,3-butadiene and isoprene is expressed as "B/I", a copolymer of 1,3-butadiene and styrene is expressed as "B/S" and a polymer block containing styrene is expressed as "S", the block copolymer is expressed as a B-B/I two-block copolymer, a B-B/S two-block copolymer, a S-B two-block copolymer, a B-B/S-S three-block copolymer, a S-B-S three-block copolymer, a S-B-S-B four-block copolymer or the like.

In the above-described formula, there is no need to always clearly define a boundary between blocks. Besides, when one polymer block is a copolymer containing two monomers A and B, A and B may be distributed homogeneously or in a tapered manner in the block.

<Polymerization Initiator>

As the polymerization initiator, at least an organomonolithium compound is preferably used.

Examples of the organomonolithium compound include, but are not limited to, a low molecular weight compound and an organomonolithium compound of a solubilized oligomer. Another example of the organomonolithium compound includes a compound having, as a bonding mode between an organic group and lithium therein, a carbon-lithium bond, a nitrogen-lithium bond or a tin-lithium bond.

The amount of the organomonolithium compound to be used as a polymerization initiator can be appropriately determined on the basis of the molecular weight of the target conjugated diene-based polymer or modified conjugated diene-based polymer. There is a tendency that the degree of polymerization relates to a ratio of the amount of a monomer such as the conjugated diene compound to be used to the amount of the polymerization initiator to be used, and i.e. the number average molecular weight and/or the weight average molecular weight relates that. Accordingly, in order to increase the molecular weight of the conjugated diene-based polymer, adjustment is preferably made to reduce the amount of the polymerization initiator, and in order to reduce the molecular weight, the adjustment is preferably made to increase the amount of the polymerization initiator.

The organomonolithium compound is preferably an alkyl lithium compound having a substituted amino group or dialkylamino lithium. In this case, a conjugated diene-based polymer having a nitrogen atom containing an amino group at a polymerization starting end is obtained.

The substituted amino group refers to an amino group having no active hydrogen or having a structure in which active hydrogen is protected. Examples of an alkyl lithium compound containing a substituted amino group having no active hydrogen include, but are not limited to, 3-dimethylaminopropyl lithium, 3-diethylaminopropyl lithium, 4-(methylpropylamino)butyl lithium and 4-hexamethyleneiminobutyl lithium. Examples of an alkyl lithium compound containing a substituted amino group having a structure in which active hydrogen is protected include, but are not limited to, 3-bistrimethylsilylaminopropyl lithium and 4-trimethylsilylmethylaminobutyl lithium.

Examples of the dialkylamino lithium include, but are not limited to, lithium dimethylamide, lithium diethylamide, lithium dipropylamide, lithium dibutylamide, lithium di-n-hexylamide, lithium diheptylamide, lithium diisopropylamide, lithium dioctylamide, lithium-di-2-ethylhexylamide, lithium didecylamide, lithium ethylpropylamide, lithium ethylbutylamide, lithium ethylbenzylamide, lithium methylphenetylamide, lithium hexamethyleneimide, lithium pyrrolidide, lithium piperidide, lithium heptamethyleneimide, lithium morpholide, 1-lithioazacyclooctane, 6-lithio-1,3,3-trimethyl-6-azabicyclo[3.2.1] octane and 1-lithio-1,2,3,6-tetrahydropyridine.

Such an organomonolithium compound having a substituted amino group can be reacted with a small amount of a polymerizable monomer, such as 1,3-butadiene, isoprene or styrene, to be used as an organomonolithium compound of a soluble oligomer.

The organomonolithium compound is preferably an alkyl lithium compound. In this case, a conjugated diene-based polymer having an alkyl group at a polymerization starting end can be obtained.

Examples of the alkyl lithium compound include, but are not limited to, n-butyllithium, sec-butyllithium, tert-butyllithium, n-hexyllithium, benzyllithium, phenyllithium and stilbene lithium. From the viewpoint of the industrial availability and the controllability of the polymerization reaction, the alkyl lithium compound is preferably n-butyllithium or sec-butyllithium.

One of these organomonolithium compounds may be singly used, or two or more of these may be used together.

Alternatively, the organomonolithium compound may be used together with another organic metal compound.

Examples of the organic metal compound include, but are not limited to, alkaline earth metal compounds, alkaline metal compounds other than lithium and other organic metal compounds.

Examples of the alkaline earth metal compounds include, but are not limited to, organic magnesium compounds, organic calcium compounds and organic strontium compounds. In addition, the examples include alkoxide, sulfonate, carbonate and amide compounds of the alkaline earth metals. Examples of the organic magnesium compounds include dibutyl magnesium and ethyl butyl magnesium. Examples of the other organic metal compounds include organic aluminum compounds.

Examples of the polymerization reaction mode employed in the polymerization step include, but are not limited to, batch and continuous polymerization reaction modes.

In the continuous mode, one reactor or two or more connected reactors can be used.

As a reactor for the continuous mode, for example, a tank or tubular reactor equipped with a stirrer is used. It is preferable, in the continuous mode, that a monomer, an inert solvent and a polymerization initiator are continuously fed to the reactor, a polymer solution containing a polymer is obtained in the reactor, and the polymer solution is continuously discharged.

As a reactor for the batch mode, for example, a tank reactor equipped with a stirrer is used. It is preferable, in the batch mode, that a monomer, an inert solvent and a polymerization initiator are fed, the monomer is continuously or intermittently additionally fed if necessary during the polymerization, a polymer solution containing a polymer is obtained in the reactor, and the polymer solution is discharged after completing the polymerization.

In order to obtain a conjugated diene-based polymer having an active end at a high ratio in the process of producing the modified conjugated diene-based polymer of the present embodiment, it is preferable to perform the polymerization step by the continuous mode in which a polymer can be continuously discharged to be supplied to a next reaction in a short period of time.

In the polymerization step, the polymerization is carried out preferably in an inert solvent.

Examples of the inert solvent include hydrocarbon-based solvents such as saturated hydrocarbon and aromatic hydrocarbon.

Examples of the hydrocarbon-based solvent include, but are not limited to, aliphatic hydrocarbons such as butane, pentane, hexane and heptane; alicyclic hydrocarbons such as cyclopentane, cyclohexane, methylcyclopentane and methylcyclohexane; aromatic hydrocarbons such as benzene, toluene and xylene; and a hydrocarbon containing a mixture of any of these.

Impurities of allenes and acetylenes are preferably treated with an organic metal compound before the solvent is supplied to the polymerization reaction because thus, a conjugated diene-based polymer having an active end in a high concentration tends to be obtained, and a modified conjugated diene-based polymer having a high modification ratio tends to be obtained.

In the polymerization step, a polar compound may be added. Thus, there is a tendency that an aromatic vinyl compound can be randomly copolymerized with the conjugated diene compound, and the polar compound can be used also as a vinylation agent for controlling a microstructure of a conjugated diene portion. Besides, there is a tendency that it is advantageous for acceleration of the polymerization reaction and the like.

Examples of the polar compound include, but are not limited to, ethers such as tetrahydrofuran, diethyl ether, dioxane, ethylene glycol dimethyl ether, ethylene glycol dibutyl ether, diethylene glycol dimethyl ether, diethylene glycol dibutyl ether, dimethoxybenzene and 2,2-bis(2-oxolanyl) propane; tertiary amine compounds such as tetramethylethylenediamine, dipiperidinoethane, trimethylamine, triethylamine, pyridine and quinuclidine; alkaline metal alkoxide compounds such as potassium-tert-amylate, potassium-tert-butylate, sodium-tert-butylate and sodium amylate; and phosphine compounds such as triphenylphosphine.

One of these polar compounds may be singly used, or two or more of these may be used together.

The amount of the polar compound to be used is not especially limited but can be selected in accordance with the purpose or the like, and is preferably 0.01 mol or more and 100 mol or less per mol of the polymerization initiator.

Such a polar compound (a vinylation agent) can be used, as a microstructure modifier for a conjugated diene portion of the polymer, in an appropriate amount in accordance with a desired amount of bound vinyl.

There is a tendency that many polar compounds simultaneously have an effective randomizing effect in copolymerization of a conjugated diene compound and an aromatic vinyl compound, and can be used as a modifier for the distribution of the aromatic vinyl compound and the amount of a styrene block. As a method for randomizing the conjugated diene compound and the aromatic vinyl compound, for example, a method as described in Japanese Patent Laid-Open No. 59-140211 in which a copolymerization reaction is started with the whole amount of styrene and a part of 1,3-butadiene with the rest of 1,3-butadiene intermittently added during the copolymerization reaction may be employed.

The conjugated diene-based polymer obtained by the polymerization step before the reaction step described later has a Mooney viscosity, measured at 110° C., of preferably 10 or more and 90 or less, more preferably 15 or more and 85 or less, and further preferably 20 or more and 60 or less.

When the Mooney viscosity falls in the above-described range, the modified conjugated diene-based polymer of the present embodiment tends to be excellent in the processability and the abrasion resistance.

The amount of bound conjugated diene in the modified conjugated diene-based polymer of the present embodiment is not especially limited, and is preferably 40% by mass or more and 100% by mass or less, and more preferably 55% by mass or more and 80% by mass or less.

Besides, the amount of bound aromatic vinyl in the modified conjugated diene-based polymer of the present embodiment is not especially limited, and is preferably 0% by mass or more and 60% by mass or less, and more preferably 20% by mass or more and 45% by mass or less.

When the amount of bound conjugated diene and the amount of bound aromatic vinyl respectively fall in the above-described ranges, the balance between the low hysteresis loss property and the wet skid resistance, the fracture characteristics and the abrasion resistance in the form of a vulcanizate, tend to be more excellent.

Here, the amount of bound aromatic vinyl can be measured using ultraviolet absorption of a phenyl group, and based on this, the amount of bound conjugated diene can be also obtained. Specifically, these amounts can be measured in accordance with a method described in the examples below.

In the modified conjugated diene-based polymer of the present embodiment, the amount of bound vinyl in a conjugated diene bond unit is not especially limited, and is preferably 10% by mole or more and 75% by mole or less, and more preferably 20% by mole or more and 65% by mole or less.

When the amount of bound vinyl falls in the above-described range, the balance between the low hysteresis loss property and the wet skid resistance in the form of a vulcanizate, the abrasion resistance and the fracture strength tend to be more excellent. Here, when the branched modified diene-based polymer is a copolymer of butadiene and styrene, the amount of bound vinyl (the amount of a 1,2-bond) in a butadiene bond unit can be obtained by Hampton method (R. R. Hampton, Analytical Chemistry, 21, 923 (1949)). Specifically, it can be measured by a method described in the examples below.

As for the microstructure of the modified conjugated diene-based polymer, when the amounts of the aforementioned bonds in the modified conjugated diene-based polymer of the present embodiment fall respectively in the numeric ranges described above and further the glass transition temperature of the modified conjugated diene-based polymer is −50° C. or more and less than −20° C., there is a tendency that a vulcanizate more excellent in the balance between the low hysteresis loss property and the wet skid resistance can be obtained. The glass transition temperature is defined as a peak top (an inflection point) of a DSC differential curve obtained by recording a DSC curve during temperature increase in a prescribed range in accordance with ISO 22768:2006. Specifically, it can be measured in accordance with a method described in the examples below.

When the modified conjugated diene-based polymer of the present embodiment is a conjugated diene-aromatic vinyl copolymer, it preferably contains a few or no blocks in which 30 or more aromatic vinyl units are chained. More specifically, when the copolymer is a butadiene-styrene copolymer, in employing a known method in which the copolymer is decomposed by Kolthoff method (a method described by I. M. Kolthoff, et al., J. Polym. Sci. 1, 429 (1946)) to analyze the amount of polystyrene insoluble in methanol, blocks in each of which 30 or more aromatic vinyl units are chained are preferably 5.0% by mass or less, and more preferably 3.0% by mass or less with respect to the total amount of the copolymer.

(Modification Step)

In the modification step, the conjugated diene-based polymer obtained by the method as described above is reacted with a modifier having a bonding group reactive to an active end of the conjugated diene-based polymer and further having a prescribed functional group having affinity or binding reactivity with a filler.

Besides, it is preferable to carry out the modification step immediately after the polymerization step. In this case, a modified conjugated diene-based polymer having a high modification ratio tends to be obtained.

When a compound having a mono-functional or di-functional bonding group is used as the modifier, a straight chain terminally modified diene-based polymer is obtained. When a compound having tri-functional or higher multi-functional bonding group is used, a branched modified diene-based polymer is obtained.

As the modifier, a mono-functional or multi-functional compound containing at least one element among nitrogen, silicon, tin, phosphorus, oxygen, sulfur and halogen is preferably used. Besides, an onium structure can be introduced into the modified conjugated diene-based polymer through a reaction by the addition of an end modifier containing an onium generating agent. Besides, a modifier containing a plurality of functional groups containing these elements in the molecule, or a modifier containing a functional group containing a plurality of these elements can be used.

The modifier preferably has a functional group having a small amount of or no active hydrogen, such as a hydroxyl group, a carboxyl group, or primary and secondary amino groups. The active hydrogen tends to inactivate an active end of the conjugated diene-based polymer.

<Specific Description of Modifier>

Examples of the nitrogen-containing compound include, but are not limited to, an isocyanate compound, an isothiocyanate compound, an isocyanuric acid derivative, a nitrogen group-containing carbonyl compound, a nitrogen group-containing vinyl compound, and a nitrogen group-containing epoxy compound.

Examples of the silicon-containing compound include, but are not limited to, a silicon halide compound, an epoxidized silicon compound, a vinylated silicon compound, an alkoxy silicon compound, and an alkoxy silicon compound containing a nitrogen-containing group.

Examples of the tin-containing compound include, but are not limited to, a tin halide compound and an organotin carboxylate compound.

Examples of the phosphorus-containing compound include, but are not limited to, a phosphorous acid ester compound and a phosphino compound.

Examples of the oxygen-containing compound include, but are not limited to, an epoxy compound, an ether compound, and an ester compound.

Examples of the sulfur-containing compound include, but are not limited to, a mercapto group derivative, a thiocarbonyl compound, and isothiocyanate.

Examples of the halogen-containing compound include, but are not limited to, the above-described silicon halide compound and tin halide compound.

Examples of the onium generating agent include a protected amine compound capable of forming primary or secondary amine (which generates ammonium), a protected phosphine compound capable of forming hydrophosphine (which generates phosphonium), and a compound capable of forming a hydroxyl group and thiol (which generates oxonium and sulfonium). An end modifier having the onium generating agent and each functional group for bonding to the modified conjugated diene-based polymer in the molecule is preferably used. Examples of the functional group for bonding to the modified conjugated diene-based polymer include a carbonyl group (ketone, ester, etc.), an unsaturated group such as a vinyl group, an epoxy group, a silicon halide group, and an alkoxy silicon group.

The modifier is preferably an amine compound having a nitrogen-containing functional group and not having active hydrogen in the nitrogen-containing functional group, and examples include a tertiary amine compound, a protected amine compound in which the above-described active hydrogen is replaced with a protective group, and an imine compound represented by the general formula —N=C.

Examples of the isocyanate compound as the nitrogen-containing compound which is the modifier include, but are not limited to, 2,4-tolylene diisocyanate, 2,6-tolylene diisocyanate, diphenylmethane diisocyanate, polymeric type diphenylmethane diisocyanate (C-MDI), phenyl isocyanate, isophorone diisocyanate, hexamethylene diisocyanate, butyl isocyanate, and 1,3,5-benzene triisocyanate.

Examples of the isocyanuric acid derivative include, but are not limited to, 1,3,5-tris(3-trimethoxysilylpropyl) isocyanurate, 1,3,5-tris(3-triethoxysilylpropyl) isocyanurate, 1,3,5-tri(oxiran-2-yl)-1,3,5-triazinane-2,4,6-trione, 1,3,5-tris(isocyanatomethyl)-1,3,5-triazinane-2,4,6-trione, and 1,3,5-trivinyl-1,3,5-triazinane-2,4,6-trione.

Examples of the nitrogen group-containing carbonyl compound include, but are not limited to, 1,3-dimethyl-2-imidazolidinone, 1-methyl-3-ethyl-2-imidazolidinone, 1-methyl-3-(2-methoxyethyl)-2-imidazolidinone, N-methyl-2-pyrrolidone, N-methyl-2-piperidone, N-methyl-2-quinolone, 4,4'-bis(diethylamino)benzophenone, 4,4'-bis(dimethylamino)benzophenone, methyl-2-pyridyl ketone, methyl-4-pyridyl ketone, propyl-2-pyridyl ketone, di-4-pyridyl ketone, 2-benzoylpyridine, N,N,N',N'-tetramethylurea, N,N-dimethyl-N',N'-diphenylurea, methyl N,N-diethylcarbamate, N,N-diethylacetamide, N,N-dimethyl-N',N'-dimethylaminoacetamide, N,N-dimethyl picolinic acid amide, and N,N-dimethyl isonicotinic acid amide.

Examples of the nitrogen group-containing vinyl compound include, but are not limited to, N,N-dimethylacrylamide, N,N-dimethylmethacrylamide, N-methylmaleimide, N-methylphthalimide, N,N-bistrimethylsilylacrylamide, morpholinoacrylamide, 3-(2-dimethylaminoethyl)styrene, (dimethylamino)dimethyl-4-vinylphenylsilane, 4,4'-vinylidenebis(N,N-dimethylaniline), 4,4'-vinylidenebis(N,N-diethylaniline), 1,1-bis(4-morpholinophenyl)ethylene, and 1-phenyl-1-(4-N,N-dimethylaminophenyl)ethylene.

Examples of the nitrogen group-containing epoxy compound include, but are not limited to, a hydrocarbon compound containing an epoxy group bonded to an amino group and further the compound may have an epoxy group bonded to an ether group. The nitrogen group-containing epoxy compound is, for example, represented by the following general formula (1).

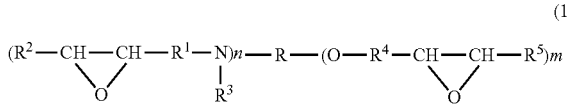
(1)

In the above-described formula (1), R is a di- or higher-valent hydrocarbon group, or a di- or higher-valent organic group having at least one polar group selected from an oxygen-containing polar group such as ether, epoxy, or ketone, a sulfur-containing polar group such as thioether or thioketone, and a nitrogen-containing polar group such as a tertiary amino group or an imino group.

The di- or higher-valent hydrocarbon group may be a saturated or unsaturated straight chain, branched, or cyclic hydrocarbon group and includes an alkylene group, an alkenylene group, a phenylene group, and the like. The hydrocarbon group is preferably a hydrocarbon group having 1 to 20 carbon atoms. Examples include methylene, ethylene, butylene, cyclohexylene, 1,3-bis(methylene)-cyclohexane, 1,3-bis(ethylene)-cyclohexane, o-, m- or p-phenylene, m- or p-xylene, and bis(phenylene)-methane.

In the above-described formula (1), each of $R^1$ and $R^4$ is a hydrocarbon group having 1 to 10 carbon atoms, and $R^1$ and $R^4$ may be the same as or different from each other.

Each of $R^2$ and $R^5$ is hydrogen or a hydrocarbon group having 1 to 10 carbon atoms, and $R^2$ and $R^5$ may be the same as or different from each other.

$R^3$ is a hydrocarbon group having 1 to 10 carbon atoms, or has a structure of formula (2) given below.

$R^1$, $R^2$, and $R^3$ may be bonded to each other to form a cyclic structure.

Besides, if $R^3$ is a hydrocarbon group, $R^3$ may be bonded to R to form a cyclic structure. The cyclic structure may be in a form in which N and R bonded to $R^3$ are directly bonded.

In the above-described formula (1), n is an integer of 1 or more, and m is 0 or an integer of 1 or more.

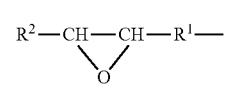
(2)

In the above-described formula (2), $R^1$ and $R^2$ are as defined in $R^1$ and $R^2$ in the above-described formula (1), and $R^1$ and $R^2$ may be the same as or different from each other.

The nitrogen group-containing epoxy compound to be used as the modifier preferably has an epoxy group-containing hydrocarbon group, and more preferably has a glycidyl group-containing hydrocarbon group.

Examples of the hydrocarbon group containing an epoxy group bonded to an amino group or an ether group include a glycidylamino group, a diglycidylamino group and a glycidoxy group. A further preferred molecular structure is an epoxy group-containing compound having a glycidylamino group or a diglycidylamino group, and a glycidoxy group and is a compound represented by the following general formula (3):

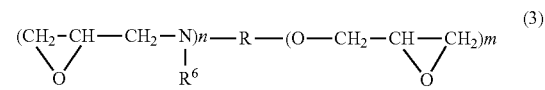
(3)

In the above-described formula (3), R is as defined in R in the above-described formula (1), and $R^6$ is a hydrocarbon group having 1 to 10 carbon atoms, or has a structure of formula (4) given below.

When $R^6$ is a hydrocarbon group, $R^6$ may be bonded to R to form a cyclic structure. In this case, a form in which N and R bonded to $R^6$ are directly bonded may be employed.

In formula (3), n is an integer of 1 or more, and m is 0 or an integer of 1 or more.

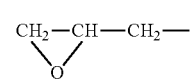
(4)

The nitrogen group-containing epoxy compound to be used as the modifier is most preferably a compound having one or more diglycidylamino groups and one or more glycidoxy groups in the molecule.

Examples of the nitrogen group-containing epoxy compound to be used as the modifier include, but are not limited to, N,N-diglycidyl-4-glycidoxyaniline, 1-N,N-diglycidylaminomethyl-4-glycidoxy-cyclohexane, 4-(4-glycidoxyphenyl)-(N,N-diglycidyl)aniline, 4-(4-glycidoxyphenoxy)-(N,N-diglycidyl)aniline, 4-(4-glycidoxybenzyl)-(N,N-diglycidyl)aniline, 4-(N,N'-diglycidyl-2-piperazinyl)-glycidoxybenzene, 1,3-bis(N,N-diglycidylaminomethyl)cyclohexane, N,N,N',N'-tetraglycidyl-m-xylenediamine, 4,4-methylene-bis(N,N-diglycidylaniline), 1,4-bis(N,N-diglycidylamino)cyclohexane, N,N,N',N'-tetraglycidyl-p-phenylenediamine, 4,4'-bis(diglycidylamino)benzophenone, 4-(4-glycidylpiperazinyl)-(N,N-diglycidyl)aniline, 2-[2-(N, N-diglycidylamino)ethyl]-1-glycidylpyrrolidine, N,N-diglycidylaniline, 4,4'-diglycidyl-dibenzylmethylamine, N,N-diglycidylaniline, N,N-diglycidyl-o-toluidine, and N,N-diglycidylaminomethylcyclohexane. Among these, N,N-diglycidyl-4-glycidoxyaniline or 1,3-bis(N,N-diglycidylaminomethyl)cyclohexane is particularly preferably employed.

Examples of the silicon halide compound which is the modifier include, but are not limited to, dibutyldichlorosilane, methyltrichlorosilane, dimethyldichlorosilane, methyldichlorosilane, trimethylchlorosilane, tetrachlorosilane, tris(trimethylsiloxy)chlorosilane, tris(dimethylamino)chlorosilane, hexachlorodisilane, bis(trichlorosilyl)methane, 1,2-bis(trichlorosilyl)ethane, 1,2-bis(methyldichlorosilyl)ethane, 1,4-bis(trichlorosilyl)butane, and 1,4-bis(methyldichlorosilyl)butane.

Examples of the epoxidized silicon compound which is the modifier include, but are not limited to, 3-glycidoxypropyltrimethoxysilane, 3-glycidoxypropyltriethoxysilane, 3-glycidoxypropylmethyldiethoxysilane, and epoxy-modified silicone.

Examples of the alkoxy silicon compound which is the modifier include, but are not limited to, tetramethoxysilane, tetraethoxysilane, triphenoxymethylsilane, and methoxy-substituted polyorganosiloxane.

Examples of the alkoxy silicon compound containing a nitrogen-containing group which is the modifier include, but are not limited to, 3-dimethylaminopropyltrimethoxysilane, 3-dimethylaminopropylmethyldimethoxysilane, 3-diethylaminopropyltriethoxysilane, 3-morpholinopropyltrimethoxysilane, 3-piperidinopropyltriethoxysilane, 3-hexamethyleneiminopropylmethyldiethoxysilane, 3-(4-methyl-1-piperazino)propyltriethoxysilane, 1-[3-(triethoxysilyl)-propyl]-3-methylhexahydropyrimidine, 3-(4-trimethylsilyl-1-piperazino) propyltriethoxysilane, 3-(3-triethylsilyl-1-imidazolidinyl) propylmethyldiethoxysilane, 3-(3-trimethylsilyl-1-hexahydropyrimidinyl)propyltrimethoxysilane, 3-dimethylamino-2-(dimethylaminomethyl)propyltrimethoxysilane, bis(3-dimethoxymethylsilylpropyl)-N-methylamine, bis(3-trimethoxysilylpropyl)-N-methylamine, bis(3-triethoxysilylpropyl)methylamine, tris(trimethoxysilyl)amine, tris(3-trimethoxysilylpropyl)amine, N,N,N',N'-tetra(3-trimethoxysilylpropyl)ethylenediamine, 3-isocyanatopropyltrimethoxysilane, 3-cyanopropyltrimethoxysilane, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(3-dimethoxymethylsilylpropyl)-1-aza-2-silacyclopentane, 2,2-dimethoxy-1-phenyl-1-aza-2-silacyclopentane, 2,2-diethoxy-1-butyl-1-aza-2-silacyclopentane, 2,2-dimethoxy-1-methyl-1-aza-2-silacyclopentane, 2,2-dimethoxy-8-(4-methylpiperazinyl)methyl-1,6-dioxa-2-silacyclooctane, and 2,2-dimethoxy-8-(N,N-diethylamino)methyl-1,6-dioxa-2-silacyclooctane.

Examples of a compound having an unsaturated bond and protected amine in the molecule as a protected amine compound capable of forming primary or secondary amine, which is the modifier include, but are not limited to, 4,4'-vinylidenebis[N,N-bis(trimethylsilyl)aniline], 4,4'-vinylidenebis[N,N-bis(triethylsilyl)aniline], 4,4'-vinylidenebis[N,N-bis(t-butyldimethylsilyl)aniline], 4,4'-vinylidenebis[N-methyl-N-(trimethylsilyl)aniline], 4,4'-vinylidenebis[N-ethyl-N-(trimethylsilyl)aniline], 4,4'-vinylidenebis[N-methyl-N-(triethylsilyl)aniline], 4,4'-vinylidenebis[N-ethyl-N-(triethylsilyl)aniline], 4,4'-vinylidenebis[N-methyl-N-(t-butyldimethylsilyl)aniline], 4,4'-vinylidenebis[N-ethyl-N-(t-butyldimethylsilyl)aniline], 1-[4-N,N-bis(trimethylsilyl)aminophenyl]-1-[4-N-methyl-N-(trimethylsilyl)aminophenyl]ethylene, and 1-[4-N,N-bis(trimethylsilyl)aminophenyl]-1-[4-N,N-dimethylaminophenyl]ethylene.

Examples of a compound having alkoxysilane and protected amine in the molecule as a protected amine compound capable of forming primary or secondary amine, which is the modifier include, but are not limited to, N,N-bis(trimethylsilyl)aminopropyltrimethoxysilane, N,N-bis(trimethylsilyl)aminopropylmethyldimethoxysilane, N,N-bis(trimethylsilyl)aminopropyltriethoxysilane, N,N-bis(trimethylsilyl)aminopropylmethyldiethoxysilane, N,N-bis(trimethylsilyl)aminoethyltrimethoxysilane, N,N-bis(trimethylsilyl)aminoethylmethyldiethoxysilane, N,N-bis(triethylsilyl)aminopropylmethyldiethoxysilane, 3-(4-trimethylsilyl-1-piperazino)propyltriethoxysilane, 3-(3-triethylsilyl-1-imidazolidinyl)propylmethyldiethoxysilane, 3-(3-trimethylsilyl-1-hexahydropyrimidinyl)propyltrimethoxysilane, 2,2-dimethoxy-1-(3-trimethoxysilylpropyl)-1-aza-2-silacyclopentane, 2,2-diethoxy-1-(3-triethoxysilylpropyl)-1-aza-2-silacyclopentane, 2,2-dimethoxy-1-(4-trimethoxysilylbutyl)-1-aza-2-silacyclohexane, 2,2-dimethoxy-1-(3-dimethoxymethylsilylpropyl)-1-aza-2-silacyclopentane, 2,2-dimethoxy-1-phenyl-1-aza-2-silacyclopentane, 2,2-diethoxy-1-butyl-1-aza-2-silacyclopentane, and 2,2-dimethoxy-1-methyl-1-aza-2-silacyclopentane.

Examples of the tin halide compound which is the modifier include, but are not limited to, tetrachloro tin, tetrabromo tin, trichlorobutyl tin, trichlorooctyl tin, dibromodimethyl tin, dichlorodibutyl tin, chlorotributyl tin, chlorotrioctyl tin, chlorotriphenyl tin, 1,2-bis(trichlorostannyl)ethane, 1,2-bis(methyldichlorostannyl)ethane, 1,4-bis(trichlorostannyl)butane, and 1,4-bis(methyldichlorostannyl)butane.

Examples of the organotin carboxylate compound which is the modifier include, but are not limited to, ethyl tin tristearate, butyl tin trioctanoate, butyl tin tristearate, butyl tin trilaurate, and dibutyl tin bisoctanoate.

Examples of the phosphorous acid ester compound which is the modifier include, but are not limited to, trimethyl phosphite, tributyl phosphite, and triphenoxide phosphite.

Examples of the phosphino compound which is the modifier include, but are not limited to: protected phosphino compounds such as P,P-bis(trimethylsilyl)phosphinopropyltrimethoxysilane and P,P-bis(triethylsilyl)phosphinopropylmethylethoxysilane, and 3-dimethylphosphinopropyltrimethoxysilane, and 3-diphenylphosphinopropyltrimethoxysilane.

Examples of the oxygen-containing compound which is the modifier include, but are not limited to: polyglycidyl ethers such as ethylene glycol diglycidyl ether and glycerin triglycidyl ether, polyepoxy compounds such as 1,4-diglycidylbenzene, 1,3,5-triglycidylbenzene, polyepoxidized liquid polybutadiene, epoxidized soybean oil, and epoxidized linseed oil, and ester compounds such as dimethyl adipate, diethyl adipate, dimethyl terephthalate, and diethyl terephthalate. These compounds generate a hydroxyl group at a polymer end.

Examples of the sulfur-containing compound which is the modifier include, but are not limited to: protected thiol compounds such as S-trimethylsilylthiopropyltrimethoxysilane and S-triethylsilylthiopropylmethyldiethylsilane; and S-methylthiopropyltrimethoxysilane, S-ethylthiopropylmethyldiethoxysilane, ethyl N,N-diethyldithiocarbamate, phenyl isothiocyanate, phenyl-1,4-diisothiocyanate, hexamethylene diisothiocyanate, and butyl isothiocyanate.

The modifier has preferably a silicon-containing functional group, and the silicon-containing functional group has preferably an alkoxysilyl group or a silanol group.

The alkoxysilyl group contained in the modifier tends to react with, for example, the active end of the conjugated diene-based polymer to dissociate alkoxy lithium, and to form a bond between an end of the conjugated diene-based polymer chain and silicon of the modifier residue. A value obtained by subtracting the number of SiOR groups reduced through the reaction from the total number of SiOR groups contained in one molecule of the modifier corresponds to the number of alkoxysilyl groups contained in the modifier residue. Besides, an aza-sila cycle group contained in the modifier forms a bond of a >N—Li bond and a bond between the end of the conjugated diene-based polymer and silicon of the modifier residue. It is noted that the >N—Li bond tends to be easily changed to >NH and LiOH with water or the like used in finishing. Besides, in the modifier, an unreacted and remained alkoxysilyl group tends to be easily changed to silanol (a Si—OH group) with water or the like used in the finishing.

In the modification step, when a modifier having a compound having three alkoxy group per silicon atom is used, namely, the active end of 3 mol of the conjugated diene-based polymer is reacted with 1 mol of trialkoxysilane group, there is a tendency that 1 mol of the alkoxy group remains unreacted although the reaction with the conjugated diene-based polymer occurs up to 2 mol. This can be confirmed because 1 mol of the conjugated diene-based polymer remains without reacting as an unreacted polymer. Incidentally, when a large amount of alkoxy group is reacted, a condensation reaction occurs during the finishing and storage, and hence, there is a tendency that the viscosity of the polymer can be inhibited from largely changing. Preferably, a modifier having one alkoxysilyl group per silicon atom is used.

A reaction temperature employed in the modification step is preferably a temperature equivalent to the polymerization temperature of the conjugated diene-based polymer, and particularly preferably a temperature without heating after polymerization, more preferably 0° C. or more and 120° C. or less, and further preferably 50° C. or more and 100° C. or less.

A reaction time employed in the modification step is preferably 10 seconds or more, and more preferably 30 seconds or more.

Any mixing method such as mechanical stirring or stirring with a static mixer may be applied to mixing performed in the modification step. When the polymerization step is performed in the continuous mode, the modification step is preferably performed also in the continuous mode. As a reactor used in the modification step, for example, a tank or tubular reactor equipped with a stirrer is used. The modifier may be diluted with an inert solvent and continuously supplied to the reactor. When the polymerization step is performed in the batch mode, a method in which the polymerization reactor is charged with the modifier may be adopted, or the modification step may be performed by a method in which the polymer is transferred to another reactor for performing the reaction step.

The modifier is preferably a compound represented by the following general formula (VI):

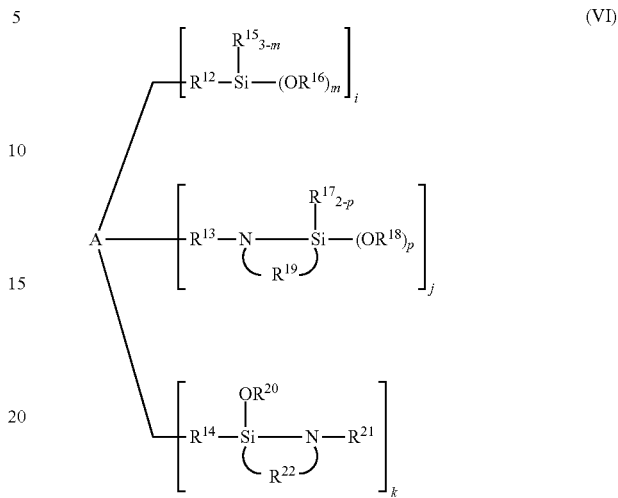

In formula (VI), $R^{12}$ to $R^{14}$ each independently represent a single bond or an alkylene group having 1 to 20 carbon atoms, $R^{15}$ to $R^{18}$ and $R^{20}$ each independently represent an alkyl group having 1 to 20 carbon atoms, $R^{19}$ and $R^{22}$ each independently represent an alkylene group having 1 to 20 carbon atoms, and $R^{21}$ represents an alkyl group or a trialkylsilyl group having 1 to 20 carbon atoms.

m represents an integer of 1 to 3, and p represents 1 or 2.

Each of $R^{12}$ to $R^{22}$, m and p, if present in a plural number, is respectively independent.

i represents an integer of 0 to 6, j represents an integer of 0 to 6, k represents an integer of 0 to 6, and (i+j+k) represents an integer of 1 to 10.

A represents a single bond, a hydrocarbon group having 1 to 20 carbon atoms, or an organic group having at least one atom selected from the group consisting of an oxygen atom, a nitrogen atom, a silicon atom, a sulfur atom and a phosphorous atom, and not having active hydrogen.

A hydrocarbon group represented by A includes saturated, unsaturated, aliphatic and aromatic hydrocarbon groups. The organic group not having active hydrogen is an organic group that inactivates an active end of the conjugated diene-based polymer. The organic group is an organic group not having a functional group having active hydrogen such as a hydroxyl group (—OH), a secondary amino group (>NH), a primary amino group (—NH$_2$) or a sulfhydryl group (—SH). If (i+j+k) is 1, A may be absent.

In the above-described formula (VI), A is preferably represented by any one of the following general formulas (II) to (V):

In formula (II), $B^1$ represents a single bond or a hydrocarbon group having 1 to 20 carbon atoms, a represents an integer of 1 to 10, and $B^1$, if present in a plural number, is respectively independent.

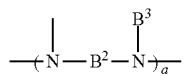
(III)

In formula (III), $B^2$ represents a single bond or a hydrocarbon group having 1 to 20 carbon atoms, $B^3$ represents an alkyl group having 1 to 20 carbon atoms, a represents an integer of 1 to 10, and each of $B^2$ and $B^3$, if present in a plural number, is respectively independent.

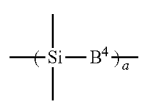
(IV)

In formula (IV), $B^4$ represents a single bond or a hydrocarbon group having 1 to 20 carbon atoms, a represents an integer of 1 to 10, and $B^4$, if present in a plural number, is respectively independent.

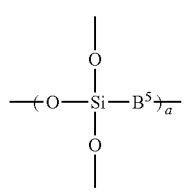
(V)

In formula (V), $B^5$ represents a single bond or a hydrocarbon group having 1 to 20 carbon atoms, a represents an integer of 1 to 10, and $B^5$, if present in a plural number, is respectively independent.

When A in the above-described formula (VI) is represented by any one of the following formulas (II) to (V), there is a tendency that a modified conjugated diene-based polymer having more excellent performance can be obtained.

Examples of the modifier of the above-described formula (VI) wherein (i+j+k) is 1 to 2 include the above-described modifier of overlap and include, but are not limited to, 3-dimethoxymethylsilylpropyldimethylamine (mono-functional), 3-trimethoxysilylpropyldimethylamine (di-functional), bis(3-trimethoxysilylpropyl)methylamine (tetra-functional), bis(3-dimethoxymethylsilylpropyl)methylamine(di-functional), (3-trimethoxysilylpropyl)-[3-(2,2-dimethoxy-1-aza-2-silacyclopentane)propyl]ethylamine (tetra-functional), [3-(2,2-dimethoxy-1-aza-2-silacyclopentane)propyl]-(3-trimethoxysilylpropyl)methylamine (tetra-functional), bis[3-(2,2-dimethoxy-1-aza-2-silacyclopentane)propyl]methylamine (tetra-functional), bis(3-triethoxysilylpropyl)ethylamine (tetra-functional), 1-(3-triethoxysilylpropyl)-2,2-diethoxy-1-aza-2-silacyclopentane (tetra-functional), 1-(3-dimethoxymethylsilylpropyl)-2,2-dimethoxy-1-aza-2-silacyclopentane (tri-functional), [3-(2,2-diethoxy-1-aza-2-silacyclopentane)propyl]-(3-diethoxyethylsilylpropyl)methylamine (tri-functional), bis[3-(2,2-diethoxy-1-aza-2-silacyclopentane)propyl]methylamine (tetra-functional), and (3-trimethoxysilylpropyl)-[3-(1-methoxy-2-trimethylsilyl-1-sila-2-azacyclopentane)propyl]methylamine (tri-functional).

Examples of the modifier of the above-described formula (VI) wherein (i+j+k) is 3 or more, and A is represented by formula (II) hereinafter include, but are not limited to, tris(3-trimethoxysilylpropyl)amine, bis(3-trimethoxysilylpropyl)-[3-(2,2-dimethoxy-1-aza-2-silacyclopentane)propyl]amine, bis[3-(2,2-dimethoxy-1-aza-2-silacyclopentane)propyl]-(3-trimethoxysilylpropyl)amine, tris[3-(2,2-dimethoxy-1-aza-2-silacyclopentane)propyl]amine, tris(3-ethoxysilylpropyl)amine, bis(3-triethoxysilylpropyl)-[3-(2,2-diethoxy-1-aza-2-silacylopentane)propyl]amine, bis[3-(2,2-diethoxy-1-aza-2-silacyclopentane)propyl]-(3-triethoxysilylpropyl)amine, tris[3-(2,2-diethoxy-1-aza-2-silacyclopentane)propyl]amine, tetrakis(3-trimethoxysilylpropyl)-1,3-propanediamine, tris(3-trimethoxysilylpropyl)-[3-(2,2-dimethoxy-1-aza-2-silacyclopentane)propyl]-1,3-propanediamine, bis(3-trimethoxysilylpropyl)-bis[3-(2,2-dimethoxy-1-aza-2-silacyclopentane)propyl]-1,3-propanedimane, tris[3-(2,2-dimethoxy-1-aza-2-silacyclopentane)propyl]-(3-trimethoxysilylpropyl)1,3-propanediamine, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-azacyclopentane)propyl]-1,3-propanediamine, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-propanediamine, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-propanediamine, tris[3-(2,2-dimethoxy-1-aza-2-silacyclopentane)propyl]-[3-(1-methoxy-2-trimethylsilyl-1-sila-2-azacyclopentane)propyl]-1,3-propanediamine, tetrakis(3-triethoxysilylpropyl)-1,3-propanediamine, tris(3-triethoxysilylpropyl)-[3-(2,2-diethoxy-1-aza-2-silacyclopentane)propyl]-1,3-propanediamine, bis(3-triethoxysilylpropyl)-bis[3-(2,2-diethoxy-1-aza-2-silacyclopentane)propyl]-1,3-propanediamine, tris(3-(2,2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris(3-triethoxysilylpropyl)-[3-(1-ethoxy-2-trimethylsilyl-1-sila-2-azacyclopentane)propyl]-1,3-propanediamine, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-propanediamine, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-propanediamine, tris[3-(2,2-diethoxy-1-aza-2-silacyclopentane)propyl]-[3-(1-ethoxy-2-trimethylsilyl-1-sila-2-azacyclopentane)propyl]-1,3-propanediamine, tetrakis(3-trimethoxysilylpropyl)-1,3-bisaminomethylcyclohexane, tris(3-trimethoxysilylpropyl)-[3-(2,2-dimethoxy-1-aza-2-silacyclopentane)propyl]-1,3-bisaminomethylcyclohexane, bis(3-trimethoxysilylpropyl)-bis[3-(2,2-dimethoxy-1-aza-2-silacyclopentane)propyl]-1,3-bisaminomethylcyclohexane, tris[3-(2,2-dimethoxy-1-aza-2-silacyclopentane)propyl]-(3-trimethoxysilylpropyl)-1,3-bisaminomethylcyclohexane, tetrakis[3-(2,2-dimethoxy-1-aza-2-silacyclopentane)propyl]-1,3-propanediamine, tris(3-trimethoxysilylpropyl)-[3-(1-methoxy-2-trimethylsilyl-1-sila-2-azacyclopentane)propyl]-1,3-bisaminomethylcyclohexane, bis(3-trimethoxysilylpropyl)-[3-(2,2-dimethoxy-1-aza-2-silacyclopentane)propyl]-[3-(1-methoxy-2-trimethylsilyl-1-sila-2-azacyclopentane)propyl]-1,3-bisaminomethylcyclohexane, bis[3-(2,2-dimethoxy-1-aza-2-silacyclopentane)propyl]-(3-trimethoxysilylpropyl)-[3-(1-methoxy-2-trimethylsilyl-1-sila-2-azacyclopentane)propyl]-1,3-bisaminomethylcyclohexane, tris[3-(2,2-dimethoxy-1-aza-2-silacyclopentane)propyl]-[3-(1-methoxy-2-trimethylsilyl-1-sila-2-azacyclopentane)propyl]-1,3-bisaminomethylcyclohexane, tetrakis(3-triethoxysilylpropyl)-1,3-propanediamine, tris(3-triethoxysilylpropyl)-[3-(2,2-diethoxy-1-aza-2-silacyclopentane)propyl]-1,3-bisaminomethylcyclohexane, bis(3-trimethoxysilylpropyl)-bis[3-(2,2-diethoxy-1-aza-2-silacyclopentane)propyl]-1,3-bisaminomethylcyclohexane, tris[3-(2, 2-diethoxy-1-aza-2-silacyclopentane)propyl]-(3-triethoxysilylpropyl)-1,3-propanediamine, tetrakis[3-(2,2-diethoxy-1-aza-2-silacyclopentane)propyl]-1,3-propanediamine, tris (3-triethoxysilylpropyl)-[3-(1-ethoxy-2-trimethylsilyl-1-sila-2-azacyclopentane)propyl]-1,3-bisaminomethylcyclohexane, bis(3-triethoxysilylpropyl)-[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, bis[3-(2,2-diethoxy-1-aza-2-silacyclopentane)propyl]-(3-triethoxysilylpropyl)-[3-(1-ethoxy-2-trimethylsilyl-1-sila-2-azacyclopentane)propyl]-1,3-bisaminomethylcyclohexane, tris[3-(2,2-diethoxy-1-aza-2-silacyclopentane)propyl]-[3-(1-ethoxy-2-trimethylsilyl-1-sila-2-azacyclopentane)propyl]-1,3-bisaminomethylcyclohexane, tetrakis(3-trimethoxysilylpropyl)-1,6-hexamethylenediamine, and pentakis(3-trimethoxysilylpropyl)-diethylenetriamine.

Examples of the modifier to be used when A in the above-described formula (VI) is represented by the above-described formula (III) include, but are not limited to, tris(3-trimethoxysilylpropyl)-methyl-1,3-propanediamine, bis(2-trimethoxysilylpropyl)-[3-(2,2-dimethoxy-1-aza-2-silacyclopentane)propyl]-methyl-1,3-propanediamine, bis[3-(2,2-dimethoxy-1-aza-2-silacyclopentane)propyl]-(3-trimethoxysilylpropyl)-methyl-1,3-propanediamine, tris(3-triethoxysilylpropyl)-methyl-1,3-propanediamine, bis(2-triethoxysilylpropyl)-[3-(2,2-diethoxy-1-aza-2-silacyclopentane)propyl]-methyl-1,3-propanediamine, bis[3-(2,2-diethoxy-1-aza-2-silacyclopentane)propyl]-(3-triethoxysilylpropyl)-methyl-1,3-propanediamine, $N^1,N^{1'}$-(propane-1,3-diyl)bis($N^1$-methyl-$N^3,N^3$-bis(3-(trimethoxysilyl)propyl)-1,3-propanediamine) and $N^1$-(3-(bis(3-(trimethoxysilyl)propyl)amino)propyl)-$N^1$-methyl-$N^3$-(methyl(3-(trimethoxysilyl)propyl)amino)propyl)-$N^3$-(3-(trimethoxysilyl)propyl)-1,3-propanediamine.

Examples of the modifier to be used when A in the above-described formula (VI) is represented by the above-described formula (IV) include, but are not limited to, tetrakis[3-(2,2-dimethoxy-1-aza-2-silacyclopentane)propyl]silane, tris[3-(2,2-dimethoxy-1-aza-2-silacyclopentane)propyl]-(3-trimethoxysilylpropyl)silane, tris[3-(2,2-dimethoxy-1-aza-2-silacyclopentane)propyl]-[3-(1-methoxy-2-trimethylsilyl-1-sila-2-azacyclopentane)propyl]silane, bis(3-trimethoxysilylpropyl)-bis[3-(2,2-dimethoxy-1-aza-2-silacyclopentane)propyl]silane, (3-trimethoxysilyl)-[3-(1-methoxy-2-trimethylsilyl-1-sila-2-azacyclopentane)-bis[3-(2,2-dimethoxy-1-aza-2-silacyclopentane)propyl]silane, bis[3-(1-methoxy-2-trimethylsilyl-1-sila-2-azacyclopentane)-bis[3-(2,2-dimethoxy-1-aza-2-silacyclopentane)propyl]silane, tris(3-trimethoxysilylpropyl)-[3-(2,2-dimethoxy-1-aza-2-silacyclopentane)propyl]silane, bis(3-trimethoxysilylpropyl)-[3-(1-methoxy-2-trimethylsilyl-1-sila-2-azacyclopentane)propyl]-[3-(2,2-dimethoxy-1-aza-2-silacyclopentane)propyl]silane, bis[3-(1-methoxy-2-trimethylsilyl-1-sila-2-azacyclopentane)propyl]-bis(3-trimethoxysilylpropyl)silane, and bis(3-trimethoxysilylpropyl)-bis[3-(1-methoxy-2-methyl-1-sila-2-azacyclopentane)propyl]silane.

Examples of the modifier to be used when A in the above-described formula (VI) is represented by the above-described formula (V) include, but are not limited to, 3-tris[2-(2,2-dimethoxy-1-aza-2-silacyclopentane)ethoxy]silyl-1-(2,2-dimethoxy-1-aza-2-silacyclopentane)propane, and 3-tris[2-(2,2-dimethoxy-1-aza-2-silacyclopentane)ethoxy]silyl-1-trimethoxysilylpropane.

Examples of the modifier of the above-described formula (VI) wherein A represents an organic group having an oxygen atom and not having active hydrogen include, but are not limited to, (3-trimethoxysilylpropyl)-[3-(2,2-dimethoxy-1-aza-2-silacyclopentane)propyl] ether (tetra-functional), and 3,4,5-tris(3-trimethoxysilylpropyl)-cyclohexyl-[3-(2,2-dimethoxy-1-aza-2-silacyclopentane)propyl] ether (octa-functional).

Examples of the modifier of the above-described formula (VI) wherein A represents an organic group having a phosphorus atom and not having active hydrogen include, but are not limited to, (3-trimethoxysilylpropyl)phosphate, bis(3-trimethoxysilylpropyl)-[3-(2,2-dimethoxy-1-aza-2-silacyclopentane)propyl]phosphate, bis[3-(2,2-dimethoxy-1-aza-2-silacyclopentane)propyl]-(3-trimethoxysilylpropyl)phosphate, and tris[3-(2,2-dimethoxy-1-aza-2-silacyclopentane)propyl]phosphate.

In the above-described formula (VI), A is preferably represented by the above-described formula (II) or the above-described formula (III), and k represents 0. Thus, an easily available modifier tends to be obtained, and furthermore, the abrasion resistance and the low hysteresis loss performance obtained when the modified conjugated diene-based polymer is made into a vulcanizate tend to be more excellent. Examples of such a modifier include, but are not limited to, bis(3-trimethoxysilylpropyl)-[3-(2,2-dimethoxy-1-aza-2-silacyclopentane)propyl]amine, tris(3-trimethoxysilylpropyl)amine, tris(3-triethoxysilylpropyl)amine, tris(3-trimethoxysilylpropyl)-[3-(2,2-dimethoxy-1-aza-2-silacyclopentane)propyl]-1,3-propanediamine, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, tris(3-trimethoxysilylpropyl)-methyl-1,3-propanediamine, and bis[3-(2,2-dimethoxy-1-aza-2-silacyclopentane)propyl]-(3-trismethoxysilylpropyl)-methyl-1,3-propanediamine.

In the above-described formula (VI), A is more preferably represented by formula (II) or formula (III), and k represents 0, and in formula (II) or formula (III), a represents an integer of 2 to 10. When such a modifier is used, the abrasion resistance and the low hysteresis loss performance obtained when vulcanized tend to be more excellent.

Examples of such a modifier include, but are not limited to, tetrakis[3-(2,2-dimethoxy-1-aza-2-silacyclopentane)propyl]-1,3-propanediamine, tetrakis(3-trimethoxysilylpropyl)-1,3-propanediamine, tetrakis(3-trimethoxysilylpropyl)-1,3-bisaminomethylcyclohexane, and $N^1$-(3-(bis(3-(trimethoxysilyl)propyl)amino)propyl)-$N^1$-methyl-$N^3$-(3-(methyl (3-(trimethoxysilyl)propyl)amino)propyl)-$N^3$-(3-(trimethoxysilyl)propyl)-1,3-propanediamine.

An addition amount of the compound represented by formula (VI) as the modifier can be adjusted so that the reaction can be performed with a mole number ratio between the polymerization initiator and the modifier set to a desired stoichiometric ratio, and thus, a desired branching degree is attained. A specific mole number of the polymerization initiator is preferably 1.0 times or more and more preferably 2.0 times or more the mole number of the modifier. In this case, in formula (VI), the number of functional groups in the modifier ((m−1)×i+p×j+k) is preferably an integer of 1 to 10, and more preferably an integer of 2 to 10.

(Hydrogenation Step)

The modified conjugated diene-based polymer of the present embodiment may have a hydrogenated conjugated diene portion. A method for hydrogenating the conjugated diene portion is not especially limited, and any of known methods can be employed.

Examples of a suitable hydrogenation method include a method in which gaseous hydrogen is blown into the polymer solution in the presence of a catalyst for hydrogenation. Examples of the catalyst include heterogeneous catalysts such as a catalyst containing a noble metal supported on a porous inorganic substance; and homogeneous catalysts such as a catalyst obtained by reacting a solubilized salt of nickel, cobalt or the like with organic aluminum or the like, and a catalyst using metallocene such as titanocene. Among these catalysts, from the viewpoint that a mild hydrogenation condition can be selected, a titanocene catalyst is preferably used. In addition, hydrogenation of an aromatic group can be performed by using a noble metal-supported catalyst.

Examples of the hydrogenation catalyst include, but are not limited to, (1) a supported heterogeneous hydrogenation catalyst obtained by supporting a metal such as Ni, Pt, Pd or Ru on carbon, silica, alumina or diatomite, (2) what is called a ziegler catalyst using an organic acid salt of Ni, Co, Fe, Cr or the like, or a transition metal salt such as acetylacetone salt, and a reducing agent such as organic aluminum, and (3) what is called an organic metal complex such as an organic metal compound of Ti, Ru, Rh or Zr. Furthermore, examples of the hydrogenation catalyst include known hydrogenation catalysts described in, for example, Japanese Patent Publication No. 42-8704, Japanese Patent Publication No. 43-6636, Japanese Patent Publication No. 63-4841, Japanese Patent Publication No. 1-37970, Japanese Patent Publication No. 1-53851, Japanese Patent Publication No. 2-9041 and Japanese Patent Laid-Open No. 8-109219. A preferable hydrogenation catalyst is a reaction mixture of a titanocene compound and a reducing organic metal compound.

In the process of producing the modified conjugated diene-based polymer of the present embodiment, a deactivator, a neutralizer or the like may be added if necessary to the resultant modified conjugated diene-based polymer solution after the modification step.

Examples of the deactivator include, but are not limited to, water; and alcohols such as methanol, ethanol and isopropanol.

Examples of the neutralizer include, but are not limited to, carboxylic acids such as stearic acid, oleic acid and versatic acid (a mixture of highly branched carboxylic acids having 9 to 11 carbon atoms, mainly 10 carbon atoms); and an aqueous solution of an inorganic acid, and a carbon dioxide gas.

To the modified conjugated diene-based polymer of the present embodiment, from the viewpoint of preventing gel formation after the polymerization and of improving stability in the processing, a stabilizer for rubber is preferably added.

As the stabilizer for rubber, any of known stabilizers, not limited to the following, can be used, and examples include antioxidants such as 2,6-di-tert-butyl-4-hydroxytoluene (BHT), n-octadecyl-3-(4'-hydroxy-3',5'-di-tert-butylphenol) propionate, and 2-methyl-4,6-bis[(octylthio)methyl]phenol.

In order to further improve the processability of the modified conjugated diene-based polymer of the present embodiment, an extender oil may be added to the modified conjugated diene-based copolymer if necessary.

A preferable example of a method for adding an extender oil to the modified conjugated diene-based polymer includes, but is not limited to, a method adding an extender oil to the polymer solution, mixing it, and desolvating the resultant oil-extended copolymer solution.

Examples of the extender oil include an aroma oil, a naphthenic oil and a paraffin oil. Among these oils, from the viewpoint of environmental safety, oil bleeding prevention and wet grip characteristics, an aroma-alternative oil containing 3% by mass or less of a polycyclic aromatic (PCA) component according to the IP 346 is preferred.

Examples of the aroma-alternative oil include TDAE (Threated Distillate Aromatic Extracts), MES (Mild Extraction Solvate) and the like mentioned in Kautschuk Gummi Kunststoffe 52 (12) 799 (1999), and RAE (Residual Aromatic Extracts).

The amount of the extender oil to be added is not especially limited, and is preferably 10 parts by mass or more and 60 parts by mass or less, and more preferably 20 parts by mass or more and 37.5 parts by mass or less with respect to 100 parts by mass of the modified conjugated diene-based polymer.

As a method for obtaining, from the polymer solution, the modified conjugated diene-based polymer of the present embodiment, any of known methods can be employed. Examples of the method include: a method filtering off the polymer after separating the solvent by steam stripping and dehydrating and drying the resultant to obtain the polymer; a method concentrating the solution in a flashing tank and devolatilizing the resultant by a vent extruder or the like; and a method devolatilizing directly the solution by using a drum dryer or the like.

[Polymer Composition]

A polymer composition of the present embodiment contains 10% by mass or more of the modified conjugated diene-based polymer of the present embodiment.

The polymer composition of the present embodiment may contain a polymer other than the modified conjugated diene-based polymer of the present embodiment.

Examples of the polymer other than the modified conjugated diene-based polymer of the present embodiment include a rubber-like polymer having a structure other than the structure of the modified conjugated diene-based polymer of the present embodiment (hereinafter referred to as "another rubber-like polymer"), and a resin-like polymer.

Examples of another rubber-like polymer include, but are not limited to, a conjugated diene-based polymer or a hydrogenated product thereof, a random copolymer of a conjugated diene-based compound and a vinyl aromatic compound or a hydrogenated product thereof, a block copolymer of a conjugated diene-based compound and a vinyl aromatic compound or a hydrogenated product thereof, a non-diene-based polymer and a natural rubber. Specific examples of another rubber-like polymer include, but are not limited to, a butadiene rubber or a hydrogenated product thereof, an isoprene rubber or a hydrogenated product thereof, styrene-based elastomers such as a styrene-butadiene rubber or a hydrogenated product thereof, a styrene-butadiene block copolymer or a hydrogenated product thereof, and a styrene-isoprene block copolymer or a hydrogenated product thereof, and an acrylonitrile-butadiene rubber or a hydrogenated product thereof.

Examples of the non-diene-based polymer include, but are not limited to, olefin-based elastomers such as an ethylene-propylene rubber, an ethylene-propylene-diene rubber, an ethylene-butene-diene rubber, an ethylene-butene rubber, an ethylene-hexene rubber and an ethylene-octene rubber, a butyl rubber, a brominated butyl rubber, an acrylic rubber, a fluorine rubber, a silicone rubber, a chlorinated polyethylene rubber, an epichlorohydrin rubber, an α, β-unsaturated nitrile-acrylic acid ester-conjugated diene copolymer rubber, a urethane rubber and a polysulfide rubber.

Examples of the natural rubber include, but are not limited to, smoked sheets of RSS Nos. 3 to 5, SMR and epoxidized natural rubber.

Examples of a mixing method for mixing the modified conjugated diene-based polymer of the present embodiment and the polymer other than the modified conjugated diene-based polymer of the present embodiment (referred to as another polymer) include various methods such as a method in which a solution of the modified conjugated diene-based polymer and a solution of another polymer are mixed, and a method in which the modified conjugated diene-based polymer and another polymer are mechanically mixed.

Another polymer described above may be in the form of a modified rubber imparted with a functional group having polarity such as a hydroxyl group or an amino group. In the case of using the polymer composition as a material for a tire, a butadiene rubber, an isoprene rubber, a styrene-butadiene rubber, a natural rubber or a butyl rubber are preferably used.

When another polymer is "another rubber-like polymer" described above, the weight average molecular weight thereof is, from the viewpoint of balance between the performance and the processing characteristics, preferably 2,000 or more and 2,000,000 or less, more preferably 5,000 or more and 1,500,000 or less. Besides, a rubber-like polymer having a low molecular weight, namely, what is called a liquid rubber, can be used. One of these other rubber-like polymers may be singly used, or two or more of these may be used together.

When the polymer composition of the present embodiment is a composition containing the modified conjugated diene-based polymer of the present embodiment and another rubber-like polymer, a content (in a mass ratio) of the modified conjugated diene-based polymer of the present embodiment to another rubber-like polymer is, in terms of (the modified conjugated diene-based polymer/another rubber-like polymer), preferably 10/90 or more and 100/0 or less, more preferably 20/80 or more and 90/10 or less, and further preferably 50/50 or more and 80/20 or less. Accordingly, the composition contains, with respect to the total amount (100 parts by mass) of the composition, the modified conjugated diene-based polymer of the present embodiment in an amount of preferably 10 parts by mass or more and 100 parts by mass or less, more preferably 20 parts by mass or more and 90 parts by mass or less, and further preferably 50 parts by mass or more and 80 parts by mass or less.

When the ratio of (the modified conjugated diene-based polymer/another rubber-like polymer) falls in the above-described range, the balance between the low hysteresis loss property and the wet skid resistance in the form of a vulcanizate is excellent, and the abrasion resistance and the fracture strength are also satisfactory.

The modified conjugated diene-based polymer of the present embodiment is suitably used as a vulcanizate. Examples of the vulcanizate include a tire, a hose, a shoe sole, an anti-vibration rubber, a vehicle component and a seismic isolation rubber as well as high-impact polystyrene and a resin reinforcing rubber for an ABS resin or the like. In particular, the modified conjugated diene-based polymer is suitably used as a tread rubber composition for a tire. The vulcanizate can be obtained, for example, by kneading the modified conjugated diene-based polymer of the present embodiment and, if necessary, an inorganic filler such as a silica-based inorganic filler or carbon black, a rubber-like polymer different from the modified conjugated diene-based polymer of the present embodiment, a silane coupling agent, a rubber softener, a vulcanizing agent, a vulcanization accelerator, a vulcanization aid or the like to obtain a rubber composition, and vulcanizing the thus obtained composition by heating.

[Rubber Composition]

A rubber composition of the present embodiment contains 100 parts by mass of a rubber-like polymer containing 10% by mass or more of the modified conjugated diene-based copolymer of the present embodiment, and 5 to 150 parts by mass of a filler.

Furthermore, the filler preferably contains a silica-based inorganic filler.

When a silica-based inorganic filler is dispersed therein, the rubber composition of the present embodiment tends to be more excellent in the processability for obtaining a vulcanizate and be more excellent in the balance between the low hysteresis loss property and the wet skid resistance in the form of a vulcanizate, and in the fracture strength and the abrasion resistance.

When the rubber composition of the present embodiment is to be used as a vulcanized rubber for a tire, a vehicle component such as an anti-vibration rubber or for shoes or the like, a silica-based inorganic filler is preferably contained.

Examples of the filler include, but are not limited to, a silica-based inorganic filler, carbon black, a metal oxide and a metal hydroxide. Among these, a silica-based inorganic filler is preferred. One of these may be singly used, or two or more of these may be used together.

A content of the filler in the rubber composition of the present embodiment is 5.0 parts by mass or more and 150 parts by mass, preferably 10 parts by mass or more and 120 parts by mass or less, and more preferably 20 parts by mass or more and 100 parts by mass or less per 100 parts by mass of the rubber-like polymer containing the modified conjugated diene-based polymer of the present embodiment.

From the viewpoint of exhibiting the effect of the filler addition, the content of the filler is 5.0 parts by mass or more, and from the viewpoint that the filler is sufficiently dispersed to attain practically sufficient processability and mechanical strength of the rubber composition, the content is 150 parts by mass or less.

The silica-based inorganic filler is not especially limited, any of known fillers can be used, a solid particle containing $SiO_2$ or $Si_3Al$ as a constituent unit is preferred, and a solid particle containing $SiO_2$ or $Si_3Al$ as a principal component of a constituent unit is more preferred. Here, the principal component refers to a component contained in the silica-based inorganic filler in an amount of 50% by mass or more, preferably 70% by mass or more, and more preferably 80% by mass or more.

Examples of the silica-based inorganic filler include, but are not limited to, silica, clay, talc, mica, diatomite, wollastonite, montmorillonite, zeolite and inorganic fibrous substances such as glass fiber. Besides, examples include a silica-based inorganic filler having a hydrophobized surface, and a mixture of a silica-based inorganic filler and an inorganic filler excluding silica. Among these, from the viewpoint of the strength and the abrasion resistance, silica and glass fiber are preferred, and silica is more preferred. Examples of the silica include dry silica, wet silica and synthetic silicate silica. Among these silica, wet silica is preferred from the viewpoint that it is excellent in the effect of improving the fracture characteristics and in the balance in the wet skid resistance.

From the viewpoint of obtaining practically good abrasion resistance and fracture characteristics in the rubber composition of the present embodiment, a nitrogen adsorption specific surface area, obtained by the BET adsorption method, of the silica-based inorganic filler is preferably 100 $m^2/g$ or more and 300 $m^2/g$ or less, and more preferably 170 $m^2/g$ or more and 250 $m^2/g$ or less. Besides, a silica-based inorganic filler having a comparatively small specific surface area (for example, a specific surface area of 200 $m^2/g$ or less) and a silica-based inorganic filler having a comparatively large specific surface area (for example, a specific surface area of 200 $m^2/g$ or more) can be used in combination if necessary.

In the present embodiment, when a silica-based inorganic filler having a comparatively large specific surface area (of, for example, 200 $m^2/g$ or more) is used in particular, the modified conjugated diene-based polymer tends to be able to be well balanced between good fracture characteristics and the low hysteresis loss property because the dispersibility of silica can be thus so improved that an effect of improving the abrasion resistance is exhibited in particular.

A content of the silica-based inorganic filler in the rubber composition of the present embodiment is preferably 5.0 parts by mass or more and 150 parts by mass and preferably 20 parts by mass or more and 100 parts by mass or less per 100 parts by mass of the rubber-like polymer containing the modified conjugated diene-based polymer. From the viewpoint of exhibiting the effect of the inorganic filler addition, the content of the silica-based inorganic filler is 5.0 parts by mass or more, and from the viewpoint that the inorganic filler is sufficiently dispersed to obtain practically sufficient processability and mechanical strength of the rubber composition, the content is 150 parts by mass or less.

Examples of the carbon black include, but are not limited to, carbon blacks of SRF, FEF, HAF, ISAF and SAF classes. Among these, a carbon black having a nitrogen adsorption specific surface area of 50 $m^2/g$ or more and dibutyl phthalate (DBP) oil absorption of 80 mL/100 g or less is preferred.

A content of the carbon black is preferably 0.5 parts by mass or more and 100 parts by mass or less, more preferably 3.0 parts by mass or more and 100 parts by mass or less, and further preferably 5.0 parts by mass or more and 50 parts by mass or less with respect to 100 parts by mass of the rubber-like polymer containing the modified conjugated diene-based polymer. From the viewpoint of exhibiting performances required in use as a tire or the like such as dry grip performance and conductivity, the content of the carbon black is preferably 0.5 parts by mass or more, and from the viewpoint of dispersibility, the content is preferably 100 parts by mass or less.

The metal oxide refers to a solid particle containing a main component of a constituent unit represented by $M_xO_y$ (wherein M represents a metal atom, and x and y each independently represent an integer of 1 to 6). Examples of the metal oxide include, but are not limited to, alumina, titanium oxide, magnesium oxide and zinc oxide.

Examples of the metal hydroxide include, but are not limited to, aluminum hydroxide, magnesium hydroxide and zirconium hydroxide.

The rubber composition of the present embodiment may contain a silane coupling agent.

The silane coupling agent is preferably a compound that has a function to improve the interaction between the rubber-like polymer and the inorganic filler, has a group having affinity with or a binding property to both of the rubber-like polymer and the silica-based inorganic filler, and contains, in one molecule, a sulfur bond portion and an alkoxysilyl group or silanol group portion. Examples of such a compound include bis-[3-(triethoxysilyl)-propyl]-tetrasulfide, bis-[3-(triethoxysilyl)-propyl]-disulfide and bis-[2-(triethoxysilyl)-ethyl]-tetrasulfide.

A content of the silane coupling agent is preferably 0.1 parts by mass or more and 30 parts by mass or less, more preferably 0.5 parts by mass or more and 20 parts by mass or less, and further preferably 1.0 part by mass or more and 15 parts by mass or less with respect to 100 parts by mass of the inorganic filler. When the content of the silane coupling agent falls in the aforementioned range, there is a tendency that the effect of the addition of the silane coupling agent can be more remarkable.

The rubber composition of the present embodiment may contain a rubber softener from the viewpoint of improvement of the processability.

As the rubber softener, a mineral oil or a liquid or low molecular weight synthetic softer is suitably used. A mineral oil-based rubber softener, which is used for softening, expanding and improving processability of a rubber and is designated as a process oil or an extender oil, is a mixture of an aromatic ring, a naphthene ring and a paraffin chain, and one in which the number of carbon atoms of the paraffin chain is 50% by mass or more of the number of all carbon atoms is designated as a paraffin-based softener, one in which the number of carbon atoms of the naphthene ring is 30% by mass or more and 45% by mass or less of the number of all carbon atoms is designated as a naphthene-based softener, and one in which the number of aromatic carbon atoms exceeds 30% by mass of the number of all carbon atoms is designated as an aromatic-based softener.

When the modified conjugated diene-based polymer of the present embodiment is a copolymer of a conjugated diene compound and a vinyl aromatic compound, a rubber softener to be used is preferably one containing an appropriate aromatic compound content because such a softener tends to fit with the copolymer.

A content of the rubber softener is preferably 0 parts by mass or more and 100 parts by mass or less, more preferably 10 parts by mass or more and 90 parts by mass or less, and further preferably 30 parts by mass or more and 90 parts by mass or less per 100 parts by mass of the rubber-like polymer containing the modified conjugated diene-based polymer. When the content of the rubber softener is 100 parts by mass or less per 100 parts by mass of the rubber-like polymer, there is a tendency that the bleeding out is suppressed and the stickiness of the surface of the rubber composition is suppressed.

Examples of a method for mixing the modified conjugated diene-based polymer and another rubber-like polymer, a silica-based inorganic filler, carbon black or another filler, a silane coupling agent, and an additive such as a rubber softener include, but are not limited to, a melt-kneading method using a general mixer such as an open roll, a banbury mixer, a kneader, a single shaft screw extruder, a twin shaft screw extruder or a multi-shaft screw extruder, and a method in which the respective components are melted and mixed followed by removal of a solvent by heating.

Among these methods, the melt-kneading method using a roll, a banbury mixer, a kneader or an extruder is preferred from the viewpoint of productivity and high kneadability. Besides, either of a method in which the rubber-like polymer and another filler, a silane coupling agent and an additive are kneaded all together or a method in which the components are mixed dividedly in plural times is applicable.

The rubber composition of the present embodiment may be a vulcanized composition having been vulcanized with a vulcanizing agent. Examples of the vulcanizing agent include, but are not limited to, radical generators such as organic peroxides and azo compounds, oxime compounds, nitroso compounds, polyamine compounds, sulfur and sulfur compounds.

The sulfur compounds include sulfur monochloride, sulfur dichloride, disulfide compounds and high molecular weight polysulfide compounds. A content of the vulcanizing agent is preferably 0.01 parts by mass or more and 20 parts by mass or less, and more preferably 0.1 parts by mass or more and 15 parts by mass or less with respect to 100 parts by mass of the rubber-like polymer. As a vulcanizing method, any of known methods is applicable, and a vulcanization temperature is preferably 120° C. or more and 200° C. or less, and more preferably 140° C. or more and 180° C. or less.

For the vulcanization, a vulcanization accelerator may be used if necessary. As the vulcanization accelerator, any of known materials can be used, and examples include, but are not limited to, sulphenamide-based, guanidine-based, thiuram-based, aldehyde-amine-based, aldehyde-ammonia-based, thiazole-based, thiourea-based and dithiocarbamate-based vulcanization accelerators. Examples of a vulcanization aid include, but are not limited to, zinc oxide and stearic acid. A content of the vulcanization accelerator is preferably 0.01 parts by mass or more and 20 parts by mass or less, and more preferably 0.1 parts by mass or more and 15 parts by mass or less with respect to 100 parts by mass of the rubber-like component.

The rubber composition may contain, as long as the object of the present embodiment is not impaired, various additives such as other softener and filler excluding those described above, a heat resistance stabilizer, an antistatic agent, a weathering stabilizer, an anti-ageing agent, a colorant and a lubricant. As another softener, any of known softeners can be used. Examples of another filler include calcium carbonate, magnesium carbonate, aluminum sulfate and barium sulfate. As each of the heat resistance stabilizer, the antistatic agent, the weathering stabilizer, the anti-ageing agent, the colorant and the lubricant, any of known materials can be used.

[Tire]

The rubber composition of the present embodiment is suitably used as a rubber composition for a tire.

The rubber composition of the present embodiment is applicable to, but not limited to, various tires such as a fuel-efficient tire, an all-season tire, a high-performance tire and a studless tire; and various tire portions such as a tread, a carcass, a sidewall and a bead. In particular, since the rubber composition for a tire containing the modified conjugated diene-based polymer of the present embodiment is excellent in the balance between the low hysteresis loss property and the wet skid resistance obtained when in the form of a vulcanizate and in the abrasion resistance, it is more suitably used as a tread of a fuel-efficient tire or a high-performance tire.

EXAMPLES

The present embodiment will now be described in detail with reference to specific examples and comparative examples, and it is noted that the present embodiment is not limited to the following examples and comparative examples.

Various properties were measured by the following methods.

<Purification of 1,3-Butadiene>

1,3-Butadiene to be used in polymerization for a modified conjugated diene-based polymer was purified by steps described below.

(Water Washing Step)

An operation was performed under conditions of circulating water in an amount of 1 $m^3$/hr and makeup water in an amount of 0.1 $m^3$/hr.

1,3-Butadiene and washing water were mixed using a static mixer (Static Mixer N60 Series manufactured by Noritake Co., Ltd.) and then transferred to a decanter, and a 1,3-butadiene phase was separated from a water phase in the decanter.

The operation was carried out under conditions of a liquid temperature of 30° C. and a decanter pressure of 1.0 MPaG.

The residence time of the 1,3-butadiene phase in the decanter was 30 minutes.

The water phase separated in the decanter was introduced into a 1,3-butadiene removal tank, mixed with steam, and heated to 89° C., and at the same time therewith, 1,3-butadiene was separated from the water phase at a total pressure of 0.01 MPaG.

(Oxygen Removal Step with Deoxygenating Agent)

Subsequently, a 10% aqueous solution of Diclean F-504 (manufactured by Kurita Water Industries Ltd.) was used as a deoxygenating agent, and the 1,3-butadiene after (Water Washing Step) described above and the aqueous solution of the deoxygenating agent were mixed in a circulating flow rate of 1 $m^3$/hr using a static mixer, to perform liquid-liquid extraction. Then, the extract was transferred to a decanter, and a 1,3-butadiene phase was separated from a water phase in the decanter.

The residence time of the 1,3-butadiene phase in the decanter was 30 minutes. The operation was carried out under conditions of a liquid temperature of 30° C. and a decanter pressure of 1.0 MPaG.

(Polymerization Inhibitor Removal Step)

Subsequently, a 10% aqueous solution of caustic soda was further mixed with the 1,3-butadiene after (Oxygen Removal Step with Deoxygenating Agent) described above in a circulating flow rate of 1 $m^3$/hr using a packed column containing a Pall ring, to perform liquid-liquid extraction. The extract was further transferred to another decanter, and a 1,3-butadiene phase was separated from a water phase in this another decanter.

The residence time of the 1,3-butadiene phase in this another decanter was 60 minutes. In the polymerization inhibitor removal step, the operation was carried out under conditions of a liquid temperature of 30° C. and a decanter pressure of 1.0 MPaG.

(Dehydrating Column Step)

Mixed hexane was added to the 1,3-butadiene phase separated in another decanter, and the mixture was supplied to a dehydrating column with a 1,3-butadiene concentration of 50% by mass.

An azeotropic mixture of 1,3-butadiene and water distilled from the top (column top) in the dehydrating column was cooled and condensed, and then transferred to a decanter, and a 1,3-butadiene phase was separated from a water phase in the decanter.

The water phase was removed, and the 1,3-butadiene phase was returned to a column inlet of the dehydrating column. The dehydrating column step was continuously performed.

A dehydrated mixed liquid of 1,3-butadiene and hexane was taken out from the bottom (column bottom) of the dehydrating column.

(Adsorption Step)

The mixed liquid of 1,3-butadiene and hexane was passed through a 500 L desiccant dryer (vertical type cylindrical tank manufactured by Hitachi, Ltd.) containing active alumina, so that a very small amount of residual impurities in 1,3-butadiene was removed by adsorption to give purified 1,3-butadiene.

<Purification of Styrene>

Styrene to be used in polymerization for a modified conjugated diene-based polymer was purified by steps described below.

γ-Alumina molded into a columnar shape of 3 mmφ×3 mm was immersed in an aqueous solution of palladium chloride having a concentration of 0.6% and dried all night and all day at 100° C. Subsequently, the dried product was reduced at a temperature of 400° C. for 16 hours under the stream of hydrogen to give a hydrogenation catalyst having the composition of Pd $(0.3\%)/\gamma\text{-Al}_2\text{O}_3$. A tubular reactor was filled with 2000 g of the obtained catalyst, and this catalyst was circulated for 8 hours with the temperature kept at 80° C. to give purified styrene.

<Purification of Normal Hexane>

Normal hexane to be used in polymerization for a modified conjugated diene-based polymer was purified by steps described below.

A tubular reactor was filled with 2000 g of Molecular Sieve 13-X (Union Showa K.K.), and the molecular sieve was circulated at room temperature for 24 hours to give purified normal hexane.

<Purity Analysis of Starting Material>

Allenes, acetylenes and amines were quantitatively analyzed as impurities in starting materials.

The allenes and the acetylenes were determined qualitatively and quantitatively by the gas chromatography method.

As a column, Rt-Alumina BOND/MAPD (Shimadzu Corporation) was used.

Besides, the amines were extracted using boric acid and quantified by the titration method to calculate total impurities (ppm).

<(Property 1) Amount of Bound Styrene>

A modified conjugated diene-based polymer was used as a sample, 100 mg of the sample was dissolved in chloroform to be diluted to 100 mL, and the resultant was used as a measurement sample.

Based on the absorption of a phenyl group of styrene at the ultraviolet absorption wavelength (in the vicinity of 254 nm), the amount of bound styrene (% by mass) with respect to 100% by mass of the modified conjugated diene-based polymer used as the sample was measured (spectrophotometer "UV-2450" manufactured by Shimadzu Corporation).

<(Property 2) Microstructure of Butadiene Portion (Amount of 1,2-Vinyl Bond)>

A modified conjugated diene-based polymer was used as a sample, 50 mg of the sample was dissolved in 10 mL of carbon disulfide, and the resultant was used as a measurement sample.

A solution cell was used to measure an infrared spectrum in a range of 600 to 1000 $cm^{-1}$, and in accordance with a calculation formula of the Hampton method (a method described by R. R. Hampton, Analytical Chemistry 21, 923 (1949)) based on absorbance at a prescribed wavelength, a microstructure of a butadiene portion, namely, the amount of a 1,2-vinyl bond (mol %) was obtained (Fourier transform infrared spectrophotometer "FT-IR230" manufactured by JASCO Corporation).

<(Property 3) Molecular Weights>

A modified conjugated diene-based polymer was used as a sample to measure a chromatogram using a GPC measurement apparatus (trade name "HLC-8320GPC" manufactured by Tosoh Corporation) including a series of three columns using a polystyrene-based gel as a filler and using an RI detector (trade name "HLC8020" manufactured by Tosoh Corporation), and on the basis of a calibration curve obtained using standard polystyrene, a weight average molecular weight ($Mw_1$), a number average molecular weight ($Mn_1$), a molecular weight distribution ($Mw_1/Mn_1$), a peak top molecular weight ($Mp_1$) of the modified conjugated diene-based polymer, and a ratio of the modified conjugated diene-based polymer having a molecular weight of 2,000,000 or more and 5,000,000 or less were obtained.

As an eluent, THF (tetrahydrofuran) was used.

As the columns, three columns available under the trade name "TSKgel SuperMultpore HZ-H" manufactured by Tosoh Corporation were connected to one another, and a guard column available under the trade name "TSKguardcolumn SuperMP(HZ)-H" manufactured by Tosoh Corporation was connected to a previous stage of these.

Ten (10) mg of the sample for the measurement was dissolved in 20 mL of THF to obtain a measurement solution, and 10 μL of the measurement solution was injected into the GPC measurement apparatus for performing the measurement under conditions of an oven temperature of 40° C. and a THF flow rate of 0.35 mL/min.

The peak top molecular weight ($Mp_1$) was obtained as follows.

On a GPC curve obtained by the measurement, a peak detected as a highest molecular weight component was selected. With respect to the selected peak, a molecular weight corresponding to the maximum value of the peak was calculated to be defined as a peak top molecular weight.

Besides, the ratio of having a molecular weight of 2,000,000 or more and 5,000,000 or less was obtained as the ratio of the mass of the component having a molecular weight of 2,000,000 or more and 5,000,000 or less to the total mass of the polymer.

<(Property 4) Mooney Viscosity of Polymer>

A modified conjugated diene-based polymer was used as a sample, and a Mooney viscosity was measured using a Mooney viscometer (trade name "VR1132" manufactured by Ueshima Seisakusho Co., Ltd.) and using an L-type rotor in accordance with JIS K6300.

A measurement temperature was set to 100° C. First, the sample was preheated for 1 minute at a test temperature, the rotor was rotated at 2 rpm, and a torque measured 4 minutes after was defined as a Mooney viscosity ($ML_{(1+4)}$).

<(Property 5) Glass Transition Temperature (Tg)>

A modified conjugated diene-based polymer was used as a sample to record a DSC curve in accordance with ISO 22768:2006 using a differential scanning calorimeter "DSC3200S" manufactured by MAC Science Co., Ltd. under a flow of helium at 50 mL/min during temperature increase from −100° C. at a rate of 20° C./min, and a peak top (an inflection point) of the thus obtained DSC differential curve was defined as a glass transition temperature. Tg is a value of the sample measured before oil addition.

<(Property 6) Modification Ratio with Respect to Total Amount of Conjugated Diene-Based Polymer>

A modified conjugated diene-based polymer was used as a sample for measurement, and a chromatogram was measured by applying a characteristic that a modified basic polymer component adsorbs to a GPC column using a silica-based gel as a filler.

A chromatogram obtained by measurement using a polystyrene-based column and a chromatogram obtained by measurement using a silica-based column were obtained by using a sample solution for measurement containing the sample for measurement and low molecular weight internal standard polystyrene, and based on a difference between these chromatograms, an adsorption amount to the silica-based column was measured to obtain a modification ratio.

Specifically, the measurement was performed as described below.

Preparation of Sample Solution for Measurement:

Ten (10) mg of the sample for measurement and 5 mg of standard polystyrene were dissolved in 20 mL of THF (tetrahydrofuran) to obtain a sample solution for measurement.

GPC Measurement Conditions using Polystyrene-based Column:

An apparatus available under the trade name of "HLC-8320GPC" manufactured by Tosoh Corporation was used, THF was used as an eluent, and 10 µL of the sample solution for measurement was injected into the apparatus to obtain a chromatogram by using an RI detector under conditions of a column oven temperature of 40° C. and a THF flow rate of 0.35 mL/min. Three columns available under the trade name "TSKgel SuperMultiporeHZ-H" manufactured by Tosoh Corporation were connected to one another, and a guard column available under the trade name "TSKguardcolumn SuperMP(HZ)-H" manufactured by Tosoh Corporation was connected to a previous stage of these.

GPC Measurement Conditions Using Silica-Based Column:

An apparatus available under the trade name of "HLC-8320GPC" manufactured by Tosoh Corporation was used, THF was used as an eluent, and 50 µL of the sample solution for measurement was injected into the apparatus to obtain a chromatogram by using an RI detector under conditions of a column oven temperature of 40° C. and a THF flow rate of 0.5 mL/min. Columns available under the trade names "Zorbax PSM-1000S", "PSM-300S" and "PSM-60S" were connected to one another to be used, and a guard column available under the trade name "DIOL 4.6×12.5 mm 5 micron" was connected to a previous stage of these to be used.

Calculation Method for Modification Ratio:

Assuming that the whole peak area was 100, the peak area of the sample was P1 and the peak area of standard polystyrene was P2 in the chromatogram obtained by using the polystyrene-based column, and that the whole peak area was 100, the peak area of the sample was P3 and the peak area of standard polystyrene was P4 in the chromatogram obtained by using the silica-based column, a modification ratio (% by mass) was obtained in accordance with the following expression:

Modification Ratio (% by mass)=[1−(P2×P3)/(P1×P4)]×100 wherein P1+P2=P3+P4=100.

<(Property 7) Modification Ratio of Low Molecular Weight Component>

On the basis of a calibration curve obtained using standard polystyrene, a weight average molecular weight ($Mw_2$), a number average molecular weight ($Mn_2$), a molecular weight distribution ($Mw_2/Mn_2$), and a peak top molecular weight ($Mp_2$) of the modified conjugated diene-based polymer were measured in accordance with the measurement described above in (Property 3).

However, the peak top molecular weight ($Mp_2$) was defined as a molecular weight at a peak top of the smallest molecular weight among molecular weights of a plurality of peak tops, if present, and the height, in a chart, of a molecular weight obtained by dividing the peak top molecular weight ($Mp_2$) by 2 was defined as L1.

The height of a molecular weight obtained by dividing the peak top molecular weight ($Mp_2$) by 2, in a chart obtained in accordance with the measurement described in (Property 6) using a silica column was defined as L2.

The modification ratio of the low molecular weight component was calculated from L1/L2.

[Modification Degree of Low Molecular Weight Component]

The modification degree of the low molecular weight component was calculated by dividing a modification ratio (FL) of the low molecular weight component obtained as described above in (Property 7) by a modification ratio (FT) with respect to the total amount of the conjugated diene-based polymer obtained as described above in (Property 6).

Modification Degree of Low Molecular Weight Component=(FL/FT)×100

<(Property 8) Shrinkage Factor (g')>

A chromatogram was measured by using a modified conjugated diene-based polymer as a sample, and using a GPC-light scattering measurement apparatus equipped with a viscosity detector including a series of three columns using a polystyrene-based gel as a filler, and on the basis of a solution viscosity and the light scattering method, a molecular weight was obtained.

As an eluent, a mixed solution of tetrahydrofuran and triethylamine (THF in TEA: prepared by mixing 5 mL of triethylamine with 1 L of tetrahydrofuran) was used.

As columns, a guard column available under the trade name of "TSKguardcolumn HHR-H" manufactured by Tosoh Corporation and columns available under the trade names "TSKgel G6000HHR", "TSKgel G5000HHR" and "TSKgel G4000HHR" manufactured by Tosoh Corporation connected to one another were used.

A GPC-light-scattering measurement apparatus (trade name "Viscotek TDAmax" manufactured by Malvern Panalytical Ltd.) equipped with a viscosity detector was used under conditions of an oven temperature of 40° C. and a THF flow rate of 1 mL/min.

Ten (10) mg of the sample for the measurement was dissolved in 20 mL of THF to obtain a measurement solution for measurement, and 200 µL of the measurement solution for measurement was injected into the GPC measurement apparatus for performing the measurement.

As for the obtained intrinsic viscosity and molecular weight of the measurement sample, when constants (K and α) in a relational expression of an intrinsic viscosity and a molecular weight ([η]=KMα ([η]: intrinsic viscosity, M: molecular weight) were defined as log K=−3.883 and α=0.771, 1000 to 20000000 were input as the range of the molecular weight M to prepare the relation between a standard intrinsic viscosity $[\eta]_0$ and the molecular weight M. An intrinsic viscosity [η] at each molecular weight M to this standard intrinsic viscosity $[\eta]_0$ was represented by $[\eta]/[\eta]_0$ as the relation of the intrinsic viscosity [η] to the standard intrinsic viscosity $[\eta]_0$ and calculated as to the respective molecular weights M, and an average thereof was defined as the shrinkage factor (g').

g' is a value averaged in the M range of 1,000,000 or more and 2,000,000 or less.

<(Property 9) Silicon Content>

A silicon content in the modified conjugated diene-based polymer was measured using an ICP mass spectrometry apparatus (Agilent 7700s manufactured by Agilent Technologies, Inc.).

<(Property 10) Nitrogen Content>

A nitrogen content in the modified conjugated diene-based polymer was measured using a trace total nitrogen analyzer (TN-2100H manufactured by Mitsubishi Chemical Analytech Co., Ltd.).

(Example 1) Modified Conjugated Diene-Based Polymer (Sample 1)

A tank pressure vessel including a stirrer and a jacket for temperature control, which had an internal volume of 10 L, had a ratio (L/D) between the internal height (L) and the internal diameter (D) of 4.0 and had an inlet in a bottom portion and an outlet in a top portion, was used as a polymerization reactor.

1,3-Butadiene, styrene and n-hexane, from which water had been precedently eliminated, were mixed respectively at rates of 18.1 g/min, 9.9 g/min and 150.1 g/min. This mixture contained 10 ppm of allenes, 12 ppm of acetylenes, and 1 ppm of amines. Total impurities were of 23 ppm.

In a static mixer provided in the middle of a pipe used for supplying the thus obtained mixed solution to the inlet of the reactor, n-butyllithium for performing a treatment for inactivating a remaining impurity was added at a rate of 0.104 mmol/min to be mixed, and the resultant mixed solution was continuously supplied to the bottom portion of the reactor.

In addition, a polar substance of 2,2-bis(2-oxolanyl) propane and a polymerization initiator of n-butyllithium were supplied respectively at rates of 0.0216 g/min and 0.252 mmol/min to the bottom portion of the polymerization reactor in which the mixed solution was vigorously stirred by the stirrer, so as to continuously perform a polymerization reaction. The temperature was controlled so that a temperature of a polymer solution in the outlet in the top portion of the reactor could be 75° C. When the polymerization was sufficiently stabilized, a small amount of the polymerization solution prior to addition of a coupling agent was taken out through the outlet disposed in the top portion of the reactor, an antioxidant (BHT) was added thereto in a ratio of 0.2 g per 100 g of the resultant polymer, the solvent was then removed, and various molecular weights were measured. Measurement results are shown in Table 1 together with other properties.

Next, to the polymer solution flown out through the outlet of the reactor, a modifier of bis(3-trimethoxysilylpropyl)-[3-(2,2-dimethoxy-1-aza-2-silacyclopentane)propyl]amine (abbreviated as "A" in the table) was continuously added in a rate of 0.043 mmol/min, and the polymer solution to which the modifier had thus been added was mixed in passing through the static mixer to cause a modification reaction.

To the polymer solution in which the modification reaction had been caused, an antioxidant (BHT) was continuously added at a rate of 0.055 g/min (a n-hexane solution) in a ratio of 0.2 g per 100 g of the resultant polymer so as to complete the coupling reaction. At the same time as the addition of the antioxidant, an oil (JOMO Process NC140 manufactured by JX Nippon Mining & Metals Corporation) was continuously added in a ratio of 37.5 g per 100 g of the resultant polymer, and the resultant was mixed by the static mixer. The solvent was removed by the steam stripping to obtain a modified conjugated diene-based polymer (sample 1). The properties of the sample 1 are shown in Table 1.

(Example 2) Modified Conjugated Diene-Based Polymer (Sample 2)

A modified conjugated diene-based polymer (sample 2) was obtained under the same conditions as in (Example 1) except that the modifier was changed to tris(3-trimethoxysilylpropyl)amine (abbreviated as "B" in the table). The properties of the sample 2 are shown in Table 1.

(Example 3) Modified Conjugated Diene-Based Polymer (Sample 3)

A modified conjugated diene-based polymer (sample 3) was obtained under the same conditions as in (Example 1) except that the modifier was changed to N,N,N'-tris(3-trimethoxysilylpropyl)-N'-[3-(2,2-dimethoxy-1-aza-2-silacyclopentane)propyl]-1,3-propanediamine (abbreviated as "C" in the table), the addition amount of the polymerization initiator n-butyllithium was changed to 0.317 mmol/min, the addition amount of the polar substance was changed to 0.027 g/min, and the addition amount of the modifier was changed to 0.041 mmol/min. The properties of the sample 3 are shown in Table 1.

(Example 4) Modified Conjugated Diene-Based Polymer (Sample 4)

A modified conjugated diene-based polymer (sample 4) was obtained under the same conditions as in (Example 1) except that the modifier was changed to N,N,N',N'-tetrakis[3-(2,2-dimethoxy-1-aza-2-silacyclopentane)propyl]-1,3-propanediamine (abbreviated as "D" in the table), and the addition amount of the modifier was changed to 0.033 mmol/min. The properties of the sample 4 are shown in Table 1.

(Example 5) Modified Conjugated Diene-Based Polymer (Sample 5)

A modified conjugated diene-based polymer (sample 5) was obtained under the same conditions as in (Example 1) except that the addition amount of the polymerization initiator n-butyllithium was changed to 0.15 mmol/min, the addition amount of the polar substance was changed to 0.0131 g/min, the modifier was changed to N-(3-trimethoxysilylpropyl)-2,2-dimethoxy-1-aza-2-silacyclopentane (abbreviated as "E" in the table), and the addition amount of the modifier was changed to 0.037 mmol/min. The properties of the sample 5 are shown in Table 1.

(Example 6) Modified Conjugated Diene-Based Polymer (Sample 6)

A modified conjugated diene-based polymer (sample 6) was obtained under the same conditions as in (Example 1) except that the addition amount of the polymerization initiator n-butyllithium was changed to 0.08 mmol/min, the addition amount of the polar substance was changed to 0.0076 g/min, the modifier was changed to N-3-trimethoxysilylpropyltriazole (abbreviated as "F" in the table), and the addition amount of the modifier was changed to 0.041 mmol/min. The properties of the sample 6 are shown in Table 1.

(Example 7) Modified Conjugated Diene-Based Polymer (Sample 7)

A modified conjugated diene-based polymer (sample 7) was obtained under the same conditions as in (Example 1) except that the addition amounts of butadiene and styrene were changed to 23 g/min and 5 g/min, respectively, and the addition amount of the polar substance was changed to 0.0155 g/min. The properties of the sample 7 are shown in Table 1.

(Example 8) Modified Conjugated Diene-Based Polymer (Sample 8)

A modified conjugated diene-based polymer (sample 8) was obtained under the same conditions as in (Example 4) except that the addition amounts of butadiene and styrene were changed to 16 g/min and 12 g/min, respectively, and the addition amount of the polar substance was changed to 0.024 g/min. The properties of the sample 8 are shown in Table 1.

(Example 9) Modified Conjugated Diene-Based Polymer (Sample 9)

A modified conjugated diene-based polymer (sample 9) was obtained under the same conditions as in (Example 6) except that a modifier of N,N-dimethyl-phenyldimethoxysilylpropylamine (abbreviated as "G" in the table) was continuously added in a rate of 0.03 mmol/min. The properties of the sample 9 are shown in Table 1.

(Example 10) Modified Conjugated Diene-Based Polymer (Sample 10)

A modified conjugated diene-based polymer (sample 10) was obtained under the same conditions as in (Example 1) except that the addition amount of the modifier was changed to 0.028 mmol/min. The properties of the sample 10 are shown in Table 1.

(Example 11) Modified Conjugated Diene-Based Polymer (Sample 11)

Sample 11 was obtained by kneading the sample 4 and the sample 9 at a mass ratio of 2:1. The properties of the sample 11 are shown in Table 2.

(Comparative Example 1) Modified Conjugated Diene-Based Polymer (Sample 12)

In the purification of 1,3-butadiene, the residence time of the 1,3-butadiene phase in the decanter in the water washing step was adjusted to 10 minutes. Besides, the residence time of the 1,3-butadiene phase in the decanter in the polymerization inhibitor removal step was adjusted to 20 minutes. Besides, in the purification of styrene, a hydrogenation catalyst of Pd (0.3%)/γ-$Al_2O_3$ was obtained. A tubular reactor was filled with 2000 g of the obtained catalyst, and this catalyst was circulated for 4 hours with the temperature kept at 80° C., and resultant purified styrene was used. In the purification of normal hexane, the purification was carried out in the same manner as in (Example 1).
A mixture of 1,3-butadiene, styrene and n-hexane contained 25 ppm of allenes, 20 ppm of acetylenes, and 9 ppm of amines. Total impurities were of 54 ppm. A modified conjugated diene-based polymer (sample 12) was obtained in the same manner as in (Example 1) except that this mixture was used. The properties of the sample 12 are shown in Table 2.

(Comparative Example 2) Modified Conjugated Diene-Based Polymer (Sample 13)

A modified conjugated diene-based polymer (sample 13) was obtained under the same conditions as in (Example 1) except that the addition amount of the modifier was changed to 0.020 mmol/min. The properties of the sample 13 are shown in Table 2.

(Comparative Example 3) Modified Conjugated Diene-Based Polymer (Sample 14)

A modified conjugated diene-based polymer (sample 14) was obtained under the same conditions as in (Comparative Example 1) except that a modifier of N,N-dimethyl-phenyldimethoxysilylpropylamine (abbreviated as "G" in the table) was continuously added in a rate of 0.03 mmol/min. The properties of the sample 14 are shown in Table 2.

(Comparative Example 4) Modified Conjugated Diene-Based Polymer (Sample 15)

A temperature-controllable autoclave having an internal volume of 10 L and equipped with a stirrer and a jacket was used as a rector, 518 g of purified 1,3-butadiene, 282 g of styrene, 5600 g of normal hexane, and 0.53 g of the polar substance were put in the reactor in the same manner as in (Example 1), and 8.75 mmol of a polymerization initiator of n-butyllithium was supplied to the reactor after the inside temperature of the reactor was kept at 55° C.
After starting the reaction, the inside temperature of the reactor reached to 83° C. by heat generation ascribable to polymerization.
A lapse of 1 minute after the temperature of the reactor started to decrease was regarded as the end of the polymerization reaction.
After the end of the polymerization reaction, 4.375 mmol of 3-(4-methylpiperazin-1-yl)propyltriethoxysilane was added into the solution phase when the inside temperature of the reactor was 83° C., and a modification reaction was carried out by stirring for 5 minutes. An antioxidant (BHT) was added to the modified polymer solution in a ratio of 0.2 g per 100 g of the polymer to give a modified conjugated diene-based polymer (sample 15). No oil was added. The properties of the sample 15 are shown in Table 1. g' was not calculable because the amount of the component having a molecular weight in the range of 1,000,000 or more and 2,000,000 or less was too small.

(Example 12) Modified Conjugated Diene-Based Polymer (Sample 16)

The modified conjugated diene-based polymer obtained by (Comparative Example 1) and the modified conjugated diene-based polymer obtained by (Comparative Example 4) were mixed at a mass ratio of (Comparative Example 1):(Comparative Example 4)=2:1 to give sample 16. The properties of the sample 16 are shown in Table 2.

(Example 13) Modified Conjugated Diene-Based Polymer (Sample 17)

The modified conjugated diene-based polymer obtained by (Comparative Example 2) and the modified conjugated diene-based polymer obtained by (Comparative Example 4) were mixed at a mass ratio of (Comparative Example 2):(Comparative Example 4)=2:1 to give sample 17. The properties of the sample 17 are shown in Table 2.

TABLE 1

| | No. | | Example 1 | Example 2 | Example 3 | Example 4 | Example 5 |
|---|---|---|---|---|---|---|---|
| Modified Conjugated Diene-based Polymer (Sample No.) | | | 1 | 2 | 3 | 4 | 5 |
| Polymerization Conditions | 1,3-Butadiene | g/min | 18.1 | 18.1 | 18.1 | 18.1 | 18.1 |
| | Styrene | g/min | 9.9 | 9.9 | 9.9 | 9.9 | 9.9 |
| | Normal Hexane | g/min | 150.1 | 150.1 | 150.1 | 150.1 | 150.1 |
| | Total impurities | ppm | 23 | 23 | 23 | 23 | 23 |
| | Polymerization Temperature | °C. | 70 | 70 | 70 | 70 | 70 |
| | n-Butyllithium for treatment | mmol/min | 0.104 | 0.104 | 0.104 | 0.104 | 0.104 |
| | n-Butyllithium as polymerization initiator | mmol/min | 0.252 | 0.252 | 0.317 | 0.252 | 0.15 |
| | Amount of Polar Substance | g/min | 0.0216 | 0.0216 | 0.027 | 0.0216 | 0.0131 |
| | Modifier Type | — | A | B | C | D | E |
| | Amount | mmol/min | 0.043 | 0.043 | 0.041 | 0.033 | 0.037 |
| Properties | (Property 1) Amount of Bound Styrene | % by mass | 35 | 35 | 35 | 35 | 35 |
| | (Property 2) Amount of 1,2-Vinyl Bond | mol % | 41 | 41 | 41 | 41 | 41 |
| | (Property 3) Weight Average Molecular Weight | $10^4$ g/mol | 65.1 | 64.8 | 65.3 | 83.9 | 63.9 |
| | (Property 3) Number Average Molecular Weight | $10^4$ g/mol | 31.8 | 31.7 | 32.2 | 38.8 | 30.6 |
| | (Property 3) Peak Top Molecular Weight | $10^4$ g/mol | 63.6 | 63.3 | 63.7 | 89.9 | 47.9 |
| | (Property 3) Molecular Weight Distribution | — | 2.05 | 2.04 | 2.03 | 2.16 | 2.09 |
| | (Property 3) Ratio of Polymer Having Molecular Weight of 2 to 5 million | % by mass | 1.6 | 1.7 | 1.9 | 3.4 | 1.3 |
| | (Property 4) Mooney Viscosity of Polymer (100° C.) | — | 56 | 59 | 64 | 81 | 61 |
| | (Property 5) Glass Transition Temperature | °C. | −24 | −24 | −24 | −24 | −24 |
| | (Property 6) Modification Ratio | % by mass | 81 | 83 | 84 | 82 | 82 |
| | (Property 7) Modification Ratio of Low Molecular Weight Component | % by mass | 47 | 49 | 43 | 43 | 46 |
| | Modification Degree of Low Molecular Weight Component | % | 58 | 59 | 51 | 52 | 56 |
| | (Property 8) Shrinkage Factor (g') | — | 0.68 | 0.67 | 0.52 | 0.51 | 0.82 |
| | (Property 9) Silicon Content | mass ppm | 57 | 55 | 73 | 58 | 59 |
| | (Property 10) Nitrogen Content | mass ppm | 19 | 19 | 36 | 31 | 17 |
| | Nitrogen/Silicon Molar Ratio | — | 0.67 | 0.69 | 0.99 | 1.07 | 0.58 |

| | No. | | Example 6 | Example 7 | Example 8 | Example 9 | Example 10 |
|---|---|---|---|---|---|---|---|
| Modified Conjugated Diene-based Polymer (Sample No.) | | | 6 | 7 | 8 | 9 | 10 |
| Polymerization Conditions | 1,3-Butadiene | g/min | 18.1 | 23 | 16 | 18.1 | 18.1 |
| | Styrene | g/min | 9.9 | 5 | 12 | 9.9 | 9.9 |
| | Normal Hexane | g/min | 150.1 | 150.1 | 150.1 | 150.1 | 150.1 |
| | Total impurities | ppm | 23 | 23 | 23 | 23 | 23 |
| | Polymerization Temperature | °C. | 70 | 70 | 70 | 70 | 70 |
| | n-Butyllithium for treatment | mmol/min | 0.104 | 0.104 | 0.104 | 0.104 | 0.104 |
| | n-Butyllithium as polymerization initiator | mmol/min | 0.08 | 0.252 | 0.252 | 0.08 | 0.252 |
| | Amount of Polar Substance | g/min | 0.0076 | 0.0155 | 0.024 | 0.0076 | 0.0216 |
| | Modifier Type | — | F | A | D | G | A |
| | Amount | mmol/min | 0.041 | 0.043 | 0.033 | 0.03 | 0.028 |
| Properties | (Property 1) Amount of Bound Styrene | % by mass | 35 | 17 | 42 | 35 | 35 |
| | (Property 2) Amount of 1,2-Vinyl Bond | mol % | 41 | 23 | 46 | 41 | 41 |
| | (Property 3) Weight Average Molecular Weight | $10^4$ g/mol | 61.6 | 64.9 | 81.3 | 31.2 | 62.7 |
| | (Property 3) Number Average Molecular Weight | $10^4$ g/mol | 29.7 | 30.1 | 37.8 | 15.0 | 29.6 |
| | (Property 3) Peak Top Molecular Weight | $10^4$ g/mol | 59.2 | 70.1 | 88.3 | 29.1 | 62.1 |
| | (Property 3) Molecular Weight Distribution | — | 2.07 | 2.16 | 2.15 | 2.08 | 2.12 |
| | (Property 3) Ratio of Polymer Having Molecular Weight of 2 to 5 million | % by mass | 1.1 | 1.5 | 4 | 0.6 | 1.4 |
| | (Property 4) Mooney Viscosity of Polymer (100° C.) | — | 58 | 54 | 64 | 31 | 49 |
| | (Property 5) Glass Transition Temperature | °C. | −24 | −63 | −10 | −24 | −24 |
| | (Property 6) Modification Ratio | % by mass | 81 | 79 | 80 | 61 | 58 |
| | (Property 7) Modification Ratio of Low Molecular Weight Component | % by mass | 50 | 41 | 42 | 32 | 30 |
| | Modification Degree of Low Molecular Weight Component | % | 62 | 52 | 53 | 52 | 52 |
| | (Property 8) Shrinkage Factor (g') | — | 0.95 | 0.73 | 0.54 | 0.97 | 0.69 |
| | (Property 9) Silicon Content | mass ppm | 31 | 58 | 57 | 110 | 37 |
| | (Property 10) Nitrogen Content | mass ppm | 50 | 20 | 42 | 65 | 12 |
| | Nitrogen/Silicon Molar Ratio | — | 3.23 | 0.69 | 1.48 | 1.18 | 0.65 |

TABLE 2

| No. | | | Example 11 | Comparative Example 1 | Comparative Example 2 | Comparative Example 3 |
|---|---|---|---|---|---|---|
| Modified Conjugated Diene-based Polymer (Sample No.) | | | 11 | 12 | 13 | 14 |
| Polymerization Conditions | 1,3-Butadiene | g/min | — | 18.1 | 18.1 | 18.1 |
| | Styrene | g/min | — | 9.9 | 9.9 | 9.9 |
| | Normal Hexane | g/min | — | 150.1 | 150.1 | 150.1 |
| | Total impurities | ppm | — | 54 | 23 | 54 |
| | Polymerization Temperature | °C. | — | 70 | 70 | 70 |
| | n-Butyllithium for treatment | mmol/min | — | 0.104 | 0.104 | 0.104 |
| | n-Butyllithium as polymerization initiator | mmol/min | — | 0.252 | 0.252 | 0.252 |
| | Amount of Polar Substance | g/min | — | 0.0216 | 0.0216 | 0.0216 |
| | Modifier Type | — | — | A | A | G |
| | Amount | mmol/min | — | 0.043 | 0.02 | 0.03 |
| Properties | (Property 1) Amount of Bound Styrene | % by mass | 35 | 35 | 35 | 35 |
| | (Property 2) Amount of 1,2-Vinyl Bond | mol % | 41 | 41 | 41 | 41 |
| | (Property 3) Weight Average Molecular Weight | $10^4$ g/mol | 73.4 | 65.1 | 64.1 | 30.1 |
| | (Property 3) Number Average Molecular Weight | $10^4$ g/mol | 30.9 | 31.8 | 29.4 | 14.2 |
| | (Property 3) Peak Top Molecular Weight | $10^4$ g/mol | 85.7 | 62.9 | 62 | 27.8 |
| | (Property 3) Molecular Weight Distribution | — | 2.38 | 2.05 | 2.18 | 2.12 |
| | (Property 3) Ratio of Polymer Having Molecular Weight of 2 to 5 million | % by mass | 2.5 | 1.6 | 1.0 | 0.5 |
| | (Property 4) Mooney Viscosity of Polymer (100° C.) | — | 65 | 56 | 44 | 29 |
| | (Property 5) Glass Transition Temperature | °C. | −24 | −24 | −24 | −24 |
| | (Property 6) Modification Ratio | % by mass | 75 | 79 | 44 | 59 |
| | (Property 7) Modification Ratio of Low Molecular Weight Component | % by mass | 40 | 31 | 11 | 26 |
| | Modification Degree of Low Molecular Weight Component | % | 53 | 39 | 25 | 44 |
| | (Property 8) Shrinkage Factor (g') | — | 0.59 | 0.69 | 0.71 | 0.96 |
| | (Property 9) Silicon Content | mass ppm | 75 | 56 | 26 | 109 |
| | (Property 10) Nitrogen Content | mass ppm | 42 | 18 | 9 | 61 |
| | Nitrogen/Silicon Molar Ratio | — | 1.13 | 0.64 | 0.69 | 1.12 |

| No. | | | Comparative Example 4 | Example 12 | Example 13 |
|---|---|---|---|---|---|
| Modified Conjugated Diene-based Polymer (Sample No.) | | | 15 | 16 | 17 |
| Polymerization Conditions | 1,3-Butadiene | g/min | 518 g | — | — |
| | Styrene | g/min | 282 g | — | — |
| | Normal Hexane | g/min | 5600 g | — | — |
| | Total impurities | ppm | 48 | — | — |
| | Polymerization Temperature | °C. | 55-83 | — | — |
| | n-Butyllithium for treatment | mmol/min | 0 | — | — |
| | n-Butyllithium as polymerization initiator | mmol/min | 8.75 mmol | — | — |
| | Amount of Polar Substance | g/min | 0.53 g | — | — |
| | Modifier Type | — | H | — | — |
| | Amount | mmol/min | 4.375 mmol | — | — |
| Properties | (Property 1) Amount of Bound Styrene | % by mass | 34 | 35 | 35 |
| | (Property 2) Amount of 1,2-Vinyl Bond | mol % | 40 | 41 | 41 |
| | (Property 3) Weight Average Molecular Weight | $10^4$ g/mol | 36.4 | 60.3 | 59.5 |
| | (Property 3) Number Average Molecular Weight | $10^4$ g/mol | 34.4 | 26.1 | 25.3 |
| | (Property 3) Peak Top Molecular Weight | $10^4$ g/mol | 35.8 | 58.9 | 56.8 |
| | (Property 3) Molecular Weight Distribution | — | 1.06 | 2.31 | 2.35 |
| | (Property 3) Ratio of Polymer Having Molecular Weight of 2 to 5 million | % by mass | 0 | 1.1 | 0.7 |
| | (Property 4) Mooney Viscosity of Polymer (100° C.) | — | 60 | 57 | 48 |
| | (Property 5) Glass Transition Temperature | °C. | −25 | −25 | −24 |
| | (Property 6) Modification Ratio | % by mass | 80 | 80 | 56 |
| | (Property 7) Modification Ratio of Low Molecular Weight Component | % by mass | 65 | 46 | 39 |
| | Modification Degree of Low Molecular Weight Component | % | 81 | 57 | 69 |
| | (Property 8) Shrinkage Factor (g') | — | — | 0.69 | 0.71 |
| | (Property 9) Silicon Content | mass ppm | 157 | 90 | 54 |
| | (Property 10) Nitrogen Content | mass ppm | 171 | 69 | 29 |
| | Nitrogen/Silicon Molar Ratio | — | 2.18 | 1.54 | 1.08 |

(Examples 14 to 26) and (Comparative Examples 5 to 8)

(Samples 1 to 17) shown in Table 1 were used as starting material rubbers, and rubber compositions respectively containing the starting material rubbers were obtained in accordance with the following compositions:

Modified conjugated diene-based polymer (any of the samples 1 to 17): 100 parts by mass (oil removed)

Silica 1 (trade name "Ultrasil 7000GR" manufactured by Evonik Degussa Gmbh, nitrogen adsorption specific surface area: 170 m²/g): 50.0 parts by mass Silica 2 (trade name "Zeosil Premium 200MP" manufactured by Rhodia, nitrogen adsorption specific surface area: 220 m²/g): 25.0 parts by mass Carbon black (trade name "SEAST KH (N339)" manufactured by Tokai Carbon Co., Ltd.): 5.0 parts by mass Silane coupling agent (trade name "Si75" manufactured by Evonik Degussa Gmbh, bis(triethoxysilylpropyl)disulfide): 6.0 parts by mass S-RAE oil (trade name "Process NC140" manufactured by JX Nippon Mining & Metals Corporation): 37.5 parts by mass Zinc oxide: 2.5 parts by mass Stearic acid: 1.0 part by mass Antioxidant (N-(1,3-dimethylbutyl)-N'-phenyl-p-phenylenediamine): 2.0 parts by mass Sulfur: 2.2 parts by mass Vulcanization accelerator 1 (N-cyclohexyl-2-benzothiazyl sulfinamide): 1.7 parts by mass Vulcanization accelerator 2 (diphenylguanidine): 2.0 parts by mass Total: 239.4 parts by mass The above-described materials were kneaded as follows to obtain a rubber composition.

A sealed mixer (internal volume: 0.3 L) equipped with a temperature controller was used, and as a first stage of kneading, the starting material rubber (any of the samples 1 to 17), the fillers (the silica 1, the silica 2 and the carbon black), the silane coupling agent, the process oil, the zinc oxide and the stearic acid were kneaded under conditions of a filling rate of 65% and a rotator rotational speed of 30 to 50 rpm.

Here, the temperature of the sealed mixer was controlled to obtain the rubber composition (compound) at a discharging temperature of 155 to 160° C.

(Evaluation 1) Time to Increase Torque

At the first stage of kneading, the time for the torque to reach a constant value from the start of increase was measured after starting the kneading in a sealed mixer.

Each measurement value was shown as an index assuming that the result of Comparative Example 5 was 100.

A smaller index indicates a shorter time to increase the torque and better moldability.

Next, as a second stage of the kneading, the compound obtained as described above was cooled to room temperature, the antioxidant was added thereto, and the resultant was kneaded again to improve the dispersibility of the silica. Also in this case, the discharging temperature for the compound was adjusted to 155 to 160° C. by the temperature control of the mixer. After the cooling, as a third stage of the kneading, sulfur and the vulcanization accelerators 1 and 2 were added to and mixed with the resultant compound by an open roll set to 70° C. Thereafter, the resultant was molded and vulcanized at 160° C. for 20 minutes by a vulcanizing press. The rubber composition was evaluated before and after the vulcanization. Specifically, the evaluation was performed by methods described below. Evaluation results are shown in Tables 3 and 4.

(Evaluation 2) Mooney Viscosity of Compound

The rubber composition obtained after the second stage of the kneading was used as a sample, and the Mooney viscosity was measured using a Mooney viscometer (trade name "VR1132" manufactured by Ueshima Seisakusho Co., Ltd.) and using an L-type rotor in accordance with JIS K6300.

A measurement temperature was set to 110° C.

First, the sample was preheated for 1 minute at a test temperature, the rotor was rotated at 2 rpm, and a torque measured 4 minutes after was defined as a Mooney viscosity $(ML_{(1+4)})$.

(Evaluation 3) Viscoelasticity Parameter

A viscoelasticity testing machine "ARES" manufactured by Rheometric Scientific, Inc. was used to measure a viscoelasticity parameter in a torsion mode as to the rubber composition after the vulcanization. Each measurement value was shown as an index obtained assuming that the result of the rubber composition of Comparative Example 5 was 100.

A tan δ measured at 0° C. at a frequency of 10 Hz and strain of 1% was used as an index of the wet grip characteristics. A larger value indicates better wet grip characteristics. The reciprocal of a tan δ measured at 50° C. at a frequency of 10 Hz and strain of 3% was used as an index of the fuel efficiency. A larger index indicates better fuel efficiency.

(Evaluation 4) Tensile Breaking Strength, Tensile Breaking Elongation, and M100

The tensile breaking strength, the tensile breaking elongation, and M100 (modulus of elasticity for at a draw ratio of 100%) were measured as to the rubber composition after the vulcanization in accordance with a tensile test of JIS K6251, and results are shown as indexes obtained assuming that the result of Comparative Example 5 was 100.

(Evaluation 5) Abrasion Resistance

An Acron abrasion tester (manufactured by Yasuda Seiki Seisakusho, Ltd.) was used to measure an abrasion amount through 1000 rotations at a load of 44.4 N as to the rubber composition after the vulcanization in accordance with JIS K6264-2, and results are shown as indexes obtained assuming that the result of Comparative Example 5 was 100. A larger index indicates better abrasion resistance.

TABLE 3

|  |  | Example 14 | Example 15 | Example 16 | Example 17 | Example 18 | Example 19 | Example 20 | Example 21 | Example 22 | Example 23 |
|---|---|---|---|---|---|---|---|---|---|---|---|
| Modified Diene-based Polymer (Sample No.) |  | 1 | 2 | 3 | 4 | 5 | 6 | 7 | 8 | 9 | 10 |
| Time to Increase Torque | index | 88 | 86 | 98 | 97 | 90 | 85 | 95 | 93 | 94 | 93 |
| Mooney Viscosity of Compound | index | 100 | 101 | 95 | 109 | 114 | 122 | 97 | 95 | 93 | 98 |
| 50° C. tanδ (strain 3%) | index | 112 | 115 | 119 | 115 | 109 | 105 | 131 | 83 | 101 | 105 |
| 0° C. tanδ (strain 1%) | index | 101 | 100 | 99 | 102 | 103 | 100 | 91 | 124 | 89 | 98 |
| Tensile Breaking Strength | index | 102 | 103 | 101 | 114 | 109 | 112 | 105 | 95 | 96 | 101 |
| Tensile Breaking Elongation | index | 99 | 100 | 100 | 116 | 109 | 110 | 104 | 92 | 91 | 100 |
| M100 | index | 91 | 88 | 86 | 89 | 92 | 96 | 81 | 119 | 100 | 95 |
| Abrasion Resistance | index | 108 | 109 | 107 | 119 | 112 | 116 | 113 | 100 | 99 | 105 |

TABLE 4

|  |  | Example 24 | Comparative Example 5 | Comparative Example 6 | Comparative Example 7 | Comparative Example 8 | Example 25 | Example 26 |
|---|---|---|---|---|---|---|---|---|
| Modified Diene-based Polymer (Sample No.) |  | 11 | 12 | 13 | 14 | 15 | 16 | 17 |
| Time to Increase Torque | index | 95 | 100 | 121 | 132 | 65 | 71 | 79 |
| Mooney Viscosity of Compound | index | 94 | 100 | 89 | 91 | 62 | 69 | 78 |
| 50° C. tanδ (strain 3%) | index | 117 | 100 | 81 | 85 | 160 | 130 | 119 |
| 0° C. tanδ (strain 1%) | index | 99 | 100 | 87 | 81 | 119 | 111 | 108 |
| Tensile Breaking Strength | index | 113 | 100 | 89 | 89 | 75 | 91 | 82 |
| Tensile Breaking Elongation | index | 110 | 100 | 92 | 92 | 78 | 89 | 81 |
| M100 | index | 88 | 100 | 121 | 115 | 61 | 73 | 85 |
| Abrasion Resistance | index | 104 | 100 | 90 | 90 | 81 | 89 | 85 |

As shown in Tables 3 and 4, it was confirmed that the rubber compositions of Examples 14 to 26 have a shorter time to increase a torque because of rapid increase in torque during kneading, and exhibits better processability than those of the rubber compositions of Comparative Examples 5 to 8.

Besides, it was confirmed that these rubber compositions of Examples 14 to 26 are excellent in the balance between the wet grip characteristics and the fuel efficiency obtained when in the form of a vulcanizate and also in the abrasion resistance.

Furthermore, it was also confirmed that these rubber compositions of Examples 14 to 26 have practically sufficient fracture strength and rigidity obtained when in the form of a vulcanizate.

The rubber composition of Comparative Example 8 was inferior in fracture strength and rigidity, though the processability and the fuel efficiency were excellent.

This application is based upon the prior Japanese patent application (Japanese Patent Application No. 2017-043229), filed to the Japanese Patent Office on Mar. 7, 2017, the entire contents of which are incorporated herein by reference.

INDUSTRIAL APPLICABILITY

A modified conjugated diene-based polymer according to the present invention is industrially applicable in the fields of tire treads, vehicle interiors and exteriors, anti-vibration rubbers, belts, shoes, foams and various industrial products.

The invention claimed is:

1. A modified conjugated diene-based polymer:
having a weight average molecular weight of 20×10⁴ or more and 300×10⁴ or less, and having a molecular weight distribution Mw/Mn of 1.6 or more and 4.0 or less, wherein a modification ratio with respect to a total amount of the conjugated diene-based polymer is 50% by mass or more,
a modification ratio of a component having a molecular weight which is ½ of a molecular weight at a peak top, or a peak top of the minimum molecular weight when a plurality of the peak tops of molecular weights is present, in a gel permeation chromatography (GPC) curve is
½ or more of the modification ratio with respect to the total amount of the conjugated diene-based polymer,
a content of nitrogen contained in the modified conjugated diene-based polymer is 3 mass ppm or more and 70 mass ppm or less, and
the modified conjugated diene-based polymer is a copolymer of a conjugated diene compound and a vinyl-substituted aromatic compound.

2. The modified conjugated diene-based polymer according to claim 1, wherein a shrinkage factor (g') measured by 3D-GPC is 0.86 or more and 1.0 or less.

3. The modified conjugated diene-based polymer according to claim 1, wherein a shrinkage factor (g') measured by 3D-GPC is 0.30 or more and less than 0.86.

4. The modified conjugated diene-based polymer according to claim 3, wherein a shrinkage factor (g') measured by 3D-GPC is 0.30 or more and 0.70 or less.

5. The modified conjugated diene-based polymer according to claim 1, wherein
each of contents of nitrogen and silicon contained in the modified conjugated diene-based polymer is 3 mass ppm or more, and
a molar ratio of nitrogen to silicon is 1.1 or more and less than 10.

6. The modified conjugated diene-based polymer according to claim 1, wherein
each of contents of nitrogen and silicon contained in the modified conjugated diene-based polymer is 3 mass ppm or more, and
a molar ratio of nitrogen to silicon is 0.1 or more and less than 0.9.

7. The modified conjugated diene-based polymer according to claim 1, wherein
a glass transition temperature of the modified conjugated diene-based polymer is −20° C. or more and 0° C. or less.

8. The modified conjugated diene-based polymer according to claim 1, wherein
a glass transition temperature of the modified conjugated diene-based polymer is −50° C. or more and less than −20° C.

9. The modified conjugated diene-based polymer according to claim 1, wherein
a glass transition temperature of the modified conjugated diene-based polymer is −70° C. or more and less than −50° C.

10. A polymer composition comprising 10% by mass or more of the modified conjugated diene-based polymer according to claim 1.

11. A rubber composition comprising:
100 parts by mass of a rubber-like polymer containing 10% by mass or more of the modified conjugated diene-based polymer according to claim 1; and
5 to 150 parts by mass of a filler.

* * * * *